(12) United States Patent
McMakin et al.

(10) Patent No.: US 7,844,081 B2
(45) Date of Patent: Nov. 30, 2010

(54) IMAGING SYSTEMS AND METHODS FOR OBTAINING AND USING BIOMETRIC INFORMATION

(75) Inventors: Douglas L. McMakin, Richland, WA (US); Mike O. Kennedy, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 1145 days.

(21) Appl. No.: 11/435,003

(22) Filed: May 15, 2006

(65) Prior Publication Data

US 2007/0263907 A1 Nov. 15, 2007

(51) Int. Cl.
*G06K 9/00* (2006.01)
(52) U.S. Cl. ...................................... 382/115
(58) Field of Classification Search ................. 382/100, 382/103, 107, 233, 173, 115; 342/90, 176, 342/109, 188, 179, 27, 180, 42, 175; 367/8; 348/222.1, E5.024, E5.031, E5.138, E5.141, 348/42, E13.06, 148, E7.085, 451, 663, E5.006, 348/36
See application file for complete search history.

(56) References Cited

U.S. PATENT DOCUMENTS

| | | |
|---|---|---|
| 3,689,772 A | 9/1972 | George et al. |
| 3,713,156 A | 1/1973 | Pothier |
| 3,755,810 A | 8/1973 | Latham et al. |
| 3,990,436 A | 11/1976 | Ott |
| 4,635,367 A | 1/1987 | Vigede |
| 4,705,401 A | 11/1987 | Addleman et al. |
| 4,737,032 A | 4/1988 | Addleman et al. |
| 4,829,303 A | 5/1989 | Zebker et al. |

(Continued)

FOREIGN PATENT DOCUMENTS

EP 0636898 2/1995

(Continued)

OTHER PUBLICATIONS

Gene Greneker, Very Low Cost Stand-off Suicide Bomber Detection System Using Human Gait Analysis to Screen Potential Bomb Carrying Individuals, May 16, 2005, Radar Sensor Technology IX, edited by Robert N. Trebits, James L. Kurtz, Proceedings of SPIE vol. 5788, pp. 46-56.*

(Continued)

*Primary Examiner*—Samir A. Ahmed
*Assistant Examiner*—A. Fitzpatrick
(74) *Attorney, Agent, or Firm*—Klarquist Sparkman, LLP

(57) ABSTRACT

Disclosed herein are exemplary embodiments of imaging systems and methods of using such systems. In one exemplary embodiment, one or more direct images of the body of a clothed subject are received, and a motion signature is determined from the one or more images. In this embodiment, the one or more images show movement of the body of the subject over time, and the motion signature is associated with the movement of the subject's body. In certain implementations, the subject can be identified based at least in part on the motion signature. Imaging systems for performing any of the disclosed methods are also disclosed herein. Furthermore, the disclosed imaging, rendering, and analysis methods can be implemented, at least in part, as one or more computer-readable media comprising computer-executable instructions for causing a computer to perform the respective methods.

27 Claims, 16 Drawing Sheets

U.S. PATENT DOCUMENTS

| | | | |
|---|---|---|---|
| 4,910,523 | A | 3/1990 | Huguenin et al. |
| 4,916,634 | A | 4/1990 | Collins et al. |
| 5,047,783 | A | 9/1991 | Hugenin |
| 5,060,393 | A | 10/1991 | Silverman et al. |
| 5,073,782 | A | 12/1991 | Huguenin et al. |
| 5,081,456 | A | 1/1992 | Michiguchi et al. |
| 5,142,255 | A | 8/1992 | Chang et al. |
| 5,170,170 | A | 12/1992 | Soumekh |
| 5,227,797 | A | 7/1993 | Murphy |
| 5,227,800 | A | 7/1993 | Huguenin et al. |
| 5,274,714 | A | 12/1993 | Hutcheson et al. |
| 5,367,552 | A | 11/1994 | Peschmann |
| 5,414,803 | A | 5/1995 | Malzbender |
| 5,455,587 | A | 10/1995 | Schneider |
| 5,455,590 | A | 10/1995 | Collins et al. |
| 5,557,283 | A | 9/1996 | Sheen et al. |
| 5,600,303 | A | 2/1997 | Husseiny et al. |
| 5,640,589 | A | 6/1997 | Takayama et al. |
| 5,680,528 | A | 10/1997 | Korszun |
| 5,720,708 | A | 2/1998 | Lu et al. |
| 5,740,800 | A | 4/1998 | Hendrickson et al. |
| 5,747,822 | A | 5/1998 | Sinclair et al. |
| 5,796,363 | A | 8/1998 | Mast |
| 5,833,599 | A | 11/1998 | Schrier et al. |
| 5,835,054 | A | 11/1998 | Warhus et al. |
| 5,857,030 | A | 1/1999 | Gaborski et al. |
| 5,859,609 | A | 1/1999 | Sheen et al. |
| 5,864,640 | A | 1/1999 | Miramonti et al. |
| 5,870,220 | A | 2/1999 | Migdal et al. |
| 5,953,448 | A | 9/1999 | Liang |
| 5,956,525 | A | 9/1999 | Minsky |
| 5,963,667 | A | 10/1999 | Hashimoto et al. |
| 5,995,014 | A | 11/1999 | DiMaria |
| 6,014,099 | A | 1/2000 | Bennett et al. |
| 6,018,562 | A | 1/2000 | Wilson |
| 6,038,337 | A | 3/2000 | Lawrence et al. |
| 6,057,761 | A | 5/2000 | Yukl |
| 6,075,455 | A | 6/2000 | DiMaria et al. |
| 6,081,750 | A | 6/2000 | Hoffberg et al. |
| 6,088,295 | A | 7/2000 | Altes |
| 6,144,388 | A | 11/2000 | Bornstein |
| 6,253,164 | B1 | 6/2001 | Rohm et al. |
| 6,271,856 | B1 | 8/2001 | Krishnamurthy |
| 6,324,532 | B1 | 11/2001 | Spence et al. |
| 6,359,582 | B1 | 3/2002 | MacAleese et al. |
| 6,373,963 | B1 | 4/2002 | Demers et al. |
| 6,377,865 | B1 | 4/2002 | Edelsbrunner et al. |
| 6,418,424 | B1 | 7/2002 | Hoffberg et al. |
| 6,441,734 | B1 | 8/2002 | Gutta et al. |
| 6,480,141 | B1 | 11/2002 | Toth et al. |
| 6,507,309 | B2 | 1/2003 | McMakin et al. |
| 6,542,249 | B1 | 4/2003 | Kofman et al. |
| 6,546,309 | B1 | 4/2003 | Gazzuolo |
| 6,639,684 | B1 | 10/2003 | Knighton et al. |
| 6,690,474 | B1 | 2/2004 | Shirley |
| 6,700,526 | B2 | 3/2004 | Witten |
| 6,703,964 | B2 | 3/2004 | McMakin et al. |
| 6,734,849 | B2 | 5/2004 | Dimsdale et al. |
| 6,777,684 | B1* | 8/2004 | Volkov et al. ............ 250/341.1 |
| 6,876,322 | B2 | 4/2005 | Keller |
| 6,927,691 | B2 | 8/2005 | Yukl |
| 6,992,616 | B2 | 1/2006 | Grudkowski et al. |
| 7,034,746 | B1 | 4/2006 | McMakin et al. |
| 7,124,044 | B2 | 10/2006 | Witten |
| 7,365,672 | B2 | 4/2008 | Keller et al. |
| 7,616,782 | B2* | 11/2009 | Badawy ...................... 382/107 |
| 2002/0130804 | A1 | 9/2002 | McMakin et al. |
| 2002/0150304 | A1 | 10/2002 | Ockman |
| 2002/0158368 | A1 | 10/2002 | Wirth, Jr. |
| 2002/0167726 | A1 | 11/2002 | Barman et al. |
| 2003/0034444 | A1 | 2/2003 | Chadwick et al. |
| 2003/0053698 | A1 | 3/2003 | Ferguson |
| 2003/0076254 | A1 | 4/2003 | Witten |
| 2003/0086525 | A1 | 5/2003 | Rhee et al. |
| 2003/0117310 | A1 | 6/2003 | Kikuchi et al. |
| 2003/0125622 | A1 | 7/2003 | Schweikard et al. |
| 2003/0128150 | A1 | 7/2003 | McMakin et al. |
| 2003/0137646 | A1 | 7/2003 | Hoffman et al. |
| 2003/0163042 | A1 | 8/2003 | Salmon |
| 2003/0179126 | A1 | 9/2003 | Jablonski et al. |
| 2004/0023612 | A1 | 2/2004 | Kriesel |
| 2004/0090359 | A1 | 5/2004 | McMakin et al. |
| 2004/0140924 | A1 | 7/2004 | Keller et al. |
| 2004/0263379 | A1 | 12/2004 | Keller |
| 2005/0210036 | A1 | 9/2005 | Vasilescu |
| 2005/0230604 | A1 | 10/2005 | Rowe et al. |
| 2005/0231415 | A1 | 10/2005 | Fleisher et al. |
| 2005/0231417 | A1 | 10/2005 | Fleisher et al. |
| 2005/0232487 | A1 | 10/2005 | Fleisher et al. |
| 2005/0234383 | A1 | 10/2005 | Dougal |
| 2006/0066469 | A1 | 3/2006 | Foote et al. |
| 2007/0001835 | A1* | 1/2007 | Ward et al. ................... 340/522 |

FOREIGN PATENT DOCUMENTS

| | | |
|---|---|---|
| GB | 2034554 | 6/1980 |
| GB | 2083715 | 3/1982 |
| RU | 2065156 | 8/1996 |
| RU | 2094821 | 10/1997 |
| RU | 2096922 | 11/1997 |
| RU | 2116671 | 7/1998 |
| RU | 2133971 | 7/1999 |
| RU | 2162235 | 1/2001 |
| WO | WO 02/17231 | 2/2002 |
| WO | WO 2005/050160 | 6/2005 |

OTHER PUBLICATIONS

Michael Otero, Application of a continuous wave radar for human gait recognition, May 25, 2005, Signal Processing, Sensor Fusion, and Target Recognition XIV, edited by Ivan Kadar, Proc. of SPIE vol. 5809, pp. 538-548.*

Jonathan L. Geisheimer, Eugene F. Greneker, William S. Marshall, A High-Resolution Doppler Model of Human Gait, Apr. 1, 2002, Radar Sensor Technology and Data Visualization, Nickolas L. Faust, James L. Kurtz, 8 Robert Trebits, Editors, Proceedings of SPIE vol. 4744 (2002), pp. 8-18.*

Abbott, "Personal Surveillance System," *IBM Technical Disclosure Bulletin*, vol. 12, No. 7, pp. 1119-1120 (Dec. 1969).

Ahles, "The Caesar Project," downloaded from thunder.temple.edu/~mridenou/pe204/BodyAnthroCaesar.html, 2 pp. (document marked Feb. 11, 1999).

Aoki et al., "Diagnosis of Under-Snow Radar Images by Three Dimensional Displaying Technique in Holographic Imaging Radar," *Proc. of IGARSS '87 Symposium*, pp. 571-576 (May 18-21, 1987).

Bone et al., "Face Recognition at a Chokepoint," 65 pp. (document marked Nov. 14, 2002).

Boyer et al., "Reconstruction of Ultrasonic Images by Backward Propagation," in *Acoustical Holography*, Ch. 18, pp. 333-349 (1970).

Bray, "Markerless Based Human Motion Capture: A Survey," Brunel University, downloaded from http://www.visicast.co.uk/members/move/Partners/Papers/MarkerlessSurvey.pdf, 44 pp. (document not dated, downloaded before May 15, 2006).

Bruner, "An Introduction to the Body Measurement System for Mass Customized Clothing," downloaded from http://www.techexchange.com/thelibrary/bmsdes.html, 11 pp. (document marked Jan. 2004).

Chellappa et al., "Human Identification Using Gait and Face," downloaded from http://www.ee.ucr.edu/~amitrc/book-chapter-biometrics.pdf, 21 pp. (document not dated, downloaded before May 15, 2006).

Collins, "Error Analysis in Scanned Holography," Thesis, Oregon State University (1970).

Cookson, "Body scanners to shape our shopping," London, 1 p. (dated at least as early as Dec. 1, 2000).

Cunado et al., "Automatic extraction and description of human gait models for recognition purposes," *Computer Vision and Image Understanding*, vol. 90, No. 1, pp. 1-41 (2003).

Cunado et al., "Gait Extraction and Description by Evidence-Gathering," *Proc. of the Second International Conference on Audio- and Video-Based Biometric Person Authentication*, pp. 43-48 (1999).

Cyberware, "Body Measurement/Garment Fitting Software," downloaded from www.cyberware.com/pressRelease/digisize_PR1.html, 2 pp. (document marked Aug. 9, 1999).

Cyberware, "Cyberware Extracts Tailor Measurements from 3D Scan Data," downloaded from www.cyberware.com/pressReleases/arn.html, 2 pp. (document marked Aug. 1, 1997).

Cyberware, "Cyberware Whole Body Scanning," downloaded from www.cyberware.com/products/WholeBody.html, 3 pp. (document marked as being last updated in 1999).

Cyberware, "Laser Sizes Up Your Body, Fits Your Clothing," downloaded from www.cyberware.com/pressReleases/digisize_PR2.html, 2 pp. (document marked Aug. 9, 1999).

Cyberware, "The World's First Whole Body Scanners Bring True Human Forms to Computer Graphics," downloaded from www.cyberware.com/pressReleases/firstWB.html, 1 p. (document marked May 11, 1995).

Dawson, "Gait Recognition: Final Report," downloaded from http://www.doc.ic.ac.uk/teaching/projects/Distinguished02/MarkDawson.pdf, 75 pp. (document marked Jun. 2002).

Farhat, "High Resolution Microwave Holography and the Imaging of Remote Moving Objects," *Optical Engineering*, vol. 14, No. 5, pp. 499-505 (1975).

Fua et al., "Markerless Full Body Shape and Motion Capture from Video Sequences," *International Archives of Photogrammetry and Remote Sensing*, vol. 34(B5), pp. 256-261 (2002).

Fujita et al., "Polarimetric Calibration of the SIR-C C-Band Channel Using Active Radar Calibrators and Polarization Selective Dihedrals," *IEEE Transactions on Geoscience and Remote Sensing*, vol. 36, No. 6, pp. 1872-1878 (1998).

Godil et al., "Human Identification from Body Shape," *Proc. of 4th IEEE International Conference on 3D Digital Imaging and Modeling*, 7 pp. (Oct. 2003).

Hildebrand et al., *An Introduction to Acoustical Holography*, pp. vii, 20-21 (1974).

Human Solutions, "Anthroscan Enables the Measurement of Large Groups of People—Quickly and Efficiently," downloaded from www.human-solutions.com, 2 pp. (document not dated, downloaded before May 15, 2006).

Human Solutions, "Intailor Individual fashion—vertically integrated," downloaded from www.human-solutions.com, 4 pp. (document not dated, downloaded before May 15, 2006).

Human Solutions, "New ScanWorX version 2.8.5 now available," downloaded from www.human-solutions.com, 3 pp. (document not dated, downloaded before May 15, 2006).

Jain et al., "Biometric Identification," *Communications of the ACM*, vol. 43, No. 2, pp. 91-98 (Feb. 2000).

Keller et al., "Privacy Algorithm for Cylindrical Holographic Weapons Surveillance System," *IEEE Aerospace and Electronic Systems Magazine*, vol. 15, No. 2, pp. 17-24 (2000).

Kukula et al., "Securing a Restricted Site—Biometric Authentication at Entry Point," *IEEE Conf. on Security Technology*, 5 pp. (Oct. 2003).

McMakin et al., "Cylindrical Holographic Imaging System Privacy Algorithm Final Report," Pacific Northwest National Laboratory, Richland, WA, 12 pp. (1999).

McMakin et al., "Detection of Concealed Weapons and Explosives on Personnel Using a Wide-band Holographic Millimeter-wave Imaging System," *American Defense Preparedness Association Security Technology Division Joint Security Technology Symposium*, 8 pp. (1996).

McMakin et al., "Millimeter wave, high-resolution, holographic surveillance system," *Proc. SPIE*, vol. 2092, pp. 525-535 (1993).

McMakin et al., "Millimeter-wave imaging for concealed weapon detection," 11 pp. (also published as McMakin et al., "Millimeter-wave imaging for concealed weapon detection," *Proc. SPIE*, vol. 5048, pp. 52-62 (Jul. 2003)).

McMakin et al., "Personnel and Mail Screening with Millimeter Waves," 9 pp. (also published as McMakin et al., "Personnel and Mail Screening with Millimeter Waves," *Proc. SPIE*, vol. 5778, pp. 160-168 (2005)).

McMakin et al., "Remote Concealed Weapons and Explosive Detection on People Using Millimeter-wave Holography," 7 pp. (also published as McMakin et al., "Remote Concealed Weapons and Explosive Detection on People Using Millimeter-wave Holography," *Security Technology 1996, 30th Annual 1996 International Carnahan Conference*, pp. 19-25 (Oct. 2-4, 1996)).

McMakin et al., "Wideband, millimeter-wave, holographic weapons surveillance systems," 11 pp. (also published as McMakin et al., "Wideband, millimeter-wave, holographic weapons surveillance systems," *Proc. SPIE*, vol. 2511, pp. 131-141 (1995)).

Michelson et al., "A Calibration Algorithm for Circular Polarimetric Radars," *Journal of Electromagnetic Waves and Applications*, vol. 11, pp. 659-674 (1997).

Moeslund et al., "A Survey of Computer Vision-Based Human Motion Capture," 73 pp. (also published as Moeslund et al., "A Survey of Computer Vision-Based Human Motion Capture," *Computer Vision and Image Understanding*, vol. 81, No. 3, pp. 231-268 (2001)).

Nixon et al., "Advances in Automatic Gait Recognition," 6 pp. (also published as Nixon et al., "Advances in Automatic Gait Recognition," *Proc. of IEEE Face and Gesture Analysis*, pp. 11-16 (2004)).

Nixon et al., "Automatic recognition by gait: progress and prospects," *Sensor Review*, vol. 23, No. 4, pp. 323-331 (2003).

Osumi et al., "Detection of buried plant," *IEE Proceedings*, vol. 135, Pt. F, No. 4 (Aug. 1988).

Phillips et al., "Face Recognition Vendor Test 2002," downloaded from www.biometrics.org/html/bc2002_sept_program/Phillips.pdf, 23 pp. (document marked 2002).

SAE International, "A Perfect Fit!," downloaded from www.sae.org/technicalcommittees, 1 p. (document not dated, downloaded on Feb. 3, 2000).

SAE International, "CAESAR™ Scope," downloaded from www.sae.org/technicalcommittees, 1 p. (document not dated, downloaded on Feb. 3, 2000).

SAE International, "CAESAR™ Executive Summary," downloaded from www.sae.org/technicalcommittees, 4 pp. (downloaded on Feb. 3, 2000).

Sheen et al., "Circularly polarized millimeter-wave imaging for personnel screening," 10 pp. (also published as Sheen et al., "Circularly polarized millimeter-wave imaging for personnel screening," *Proc. SPIE*, vol. 5789, pp. 117-126 (Mar. 2005)).

Sheen et al., "Combined illumination cylindrical millimeter-wave imaging technique for concealed weapon detection," 9 pp. (also published as Sheen et al., "Combined illumination cylindrical millimeter-wave imaging technique for concealed weapon detection," *Proc. SPIE*, vol. 4032, pp. 52-60 (Apr. 26, 2000).

Sheen et al., "Concealed explosive detection on personnel using a wideband holographic millimeter-wave imaging system," 11 pp. (also published as Sheen et al., "Concealed explosive detection on personnel using a wideband holographic millimeter-wave imaging system," *Proc. SPIE*, vol. 2755, pp. 503-513 (1996).

Sheen et al., "Cylindrical millimeter-wave imaging technique for concealed weapon detection," 9 pp. (also published as Sheen et al., "Cylindrical millimeter-wave imaging technique for concealed weapon detection," *Proc. SPIE*, vol. 3240, pp. 242-250 (Mar. 1998).

Sheen et al., "Three-Dimensional Millimeter-Wave Imaging for Concealed Weapon Detection," *IEEE Transactions on Microwave Theory and Techniques*, vol. 49, No. 9, pp. 1581-1592 (2001).

Sinclair et al., "Passive millimetre wave imaging in security scanning," *Proc. of SPIE*, vol. 4032, pp. 40-45 (2000).

Soumekh, *Fourier Array Imaging*, pp. 339-348 (1994).

Stevenage et al., "Visual Analysis of Gait as a Cue to Identity," *Applied Cognitive Psychology*, vol. 13, pp. 513-526 (1999).

TC2, "3D Body Measurement Software System," downloaded from http://www.tc2.com/products/body_software.html, 6 pp. (document not dated, downloaded before May 15, 2006).

TC2, "Measurement Extraction Software and Size Prediction Development," downloaded from http://www.tc2.com/products/extraction_software.html, 7 pp (document not dated, downloaded before May 15, 2006).

Tricoles et al., "Microwave Holography: Applications and Techniques," *Proc. of the IEEE*, vol. 65, No. 1, pp. 108-121 (Jan. 1977).

Turner et al., "Biometrics: Separating Myth From Reality," reprinted from *Corrections Today*, vol. 64, No. 7, 2 pp. (Dec. 2002).

Vasilescu, "Human Motion Signatures: Analysis, Synthesis, Recognition," *Proc. of the International Conference on Pattern Recognition*, vol. 3, pp. 456-460 (Aug. 2002).

Wang et al., "Video analysis of human dynamics—a survey," PANN Research, downloaded from http://citeseer.ist.psu.edu/715203.html, 53 pp. (document not dated, downloaded before May 15, 2006).

Wayman, "Biometric Authentication Technologies: Hype Meets the Test Results," downloaded from http://www.sagecertification.org/events/sec02/wayman.pdf, 55 pp. (2002).

Yam et al., "Extended Model-Based Automatic Gait Recognition of Walking and Running," *Proc. of 3rd Int. Conf on Audio- and Video-Based Biometric Person Authentication*, vol. 2091, pp. 278-283 (2001).

Yngvesson et al., "Endfire Tapered Slot Antennas on Dielectric Substrates," *IEEE Trans. on Antennas and Propagation*, vol. AP-33, No. 12, pp. 1392-1400 (Dec. 1985).

Yueh et al., "Calibration of polarimetric radars using in-scene reflectors," *Journal of Electromagnetic Waves and Applications*, vol. 4, No. 1, pp. 27-48 (1990).

Keller et al., "Privacy Algorithm for Airport Passenger Screening Portal," *Proc. SPIE*, vol. 4055, pp. 476-483 (Apr. 2000).

Keller et al., "Pulse-Coupled Neural Networks for Medical Image Analysis," *Proc. SPIE*, vol. 3722, pp. 444-451 (Apr. 1999).

* cited by examiner

IMAGING SYSTEMS AND METHODS FOR OBTAINING AND USING BIOMETRIC INFORMATION

STATEMENT OF GOVERNMENT SUPPORT

This invention was made with Government support under Contract DE-AC05-76RLO1830 awarded by the U.S. Department of Energy. The Government has certain rights in the invention.

FIELD

This application relates generally to the field of imaging systems that use nonvisible electromagnetic radiation and methods of using such systems.

BACKGROUND

The desire for improved security systems and methods that can reliably detect and identify individuals has increased in recent years. Some security systems, for example, use a person's fingerprint or retinal image as a means for determining the person's identity. Such systems, however, cannot be concealed and are relatively intrusive, as they require active participation by the individual being identified. Other methods involve obtaining images of an individual and analyzing the images for characteristics that are indicative of the individual's identity. Such methods typically use standard video images obtained at visible wavelengths. Consequently, the targeted individual appears in the images along with any clothing or other material on or around their body (for example, shirts, sweaters, jackets, pants, skirts, briefcases, backpacks, purses, and so on). These materials often conceal or obfuscate the underlying body of the individual, making the identification procedure undesirably difficult and often unreliable. Accordingly, there is a need for improved imaging systems and methods for unobtrusively obtaining high quality images of a clothed subject's body and using such images to determine the identity of the subject or to perform other analyses of the subject's body.

SUMMARY

Disclosed herein are exemplary embodiments of imaging systems and methods of using such systems. The disclosed embodiments and methods for using such embodiments described herein should not be construed as limiting in any way. Instead, the present disclosure is directed toward all novel and nonobvious features and aspects, along with their equivalents, of the various disclosed apparatus, methods, and systems alone and in various combinations and subcombinations with one another.

In one disclosed embodiment, one or more direct images of the body of a clothed subject are received and a motion signature is determined from the one or more images. In this embodiment, the one or more images show movement of the body of the subject over time and the motion signature is associated with the movement of the body of the subject. In certain implementations, the subject can be identified based at least in part on the motion signature. The act of identifying can comprise comparing the motion signature with a corresponding authenticated motion signature. Further, the motion signature used in the comparison can be randomly selected from among multiple possible motion signatures. In particular implementations, the motion signature is a gait signature. A determination can also be made as to whether the subject is authorized to be in a secured area based at least in part on the motion signature. In some implementations, one or more concealed objects carried by the subject are also detected from the one or more direct images. An anthropometric measurement can also be determined from the one or more images, and the subject's identity can be determined based at least in part on the anthropometric measurement in addition to the motion signature. This exemplary embodiment can further include capturing the one or more direct images by irradiating the subject with electromagnetic radiation selected to substantially penetrate clothing and substantially reflect from the body of the subject (for example, using electromagnetic radiation in a range of about 200 MHz to about 1 THz). In certain implementations, the one or more images comprise at least two images and are captured at a rate of at least about two images per second. In certain implementations, the one or more direct images are captured by irradiating the subject with electromagnetic radiation from an antenna array concealed from the subject.

In another disclosed embodiment, a direct image of the body of a clothed subject is received and an anthropometric measurement of the subject is determined from the image. In this embodiment, the image is of the subject as the subject is moving by foot. The anthropometric measurement can be, for example, of a portion of the body of the subject that is concealed by clothing. In some implementations, the subject can be identified based at least in part on the anthropometric measurement. For example, the anthropometric measurement determined from the image can be compared with a corresponding authenticated anthropometric measurement. Furthermore, the anthropometric measurement used in the comparison can be randomly selected from among multiple possible anthropometric measurements. In certain implementations, a determination can be made as to whether the subject is authorized to be in a secured area based at least in part on the anthropometric measurement determined from the image. Further, one or more concealed objects carried by the subject can also be detected from the direct image. In some implementations, the image of the subject is obtained by irradiating the subject with electromagnetic radiation having frequencies in a range of about 200 MHz to about 1 THz.

In another disclosed embodiment, a subject moving on foot is interrogated with electromagnetic radiation having frequencies in a range of about 200 MHz to about 1 THz. Returned electromagnetic radiation reflected by the subject during the interrogation is detected. Two or more images of the subject are generated from the returned electromagnetic radiation at a rate of at least two images per second. This rate can vary, and in one implementation is ten images per second or higher. In certain implementations, the electromagnetic radiation has frequencies in a range of about 5 GHz to 110 GHz or in a range of about 8 GHz to 12 GHz. In some implementations, the subject is interrogated by transmitting the electromagnetic radiation to the subject from a first antenna element of an antenna array, and the returned electromagnetic radiation from the subject that is associated with the first antenna element is detected by a second antenna element and a third antenna element of the antenna array. In particular implementations, one or more motion signatures of the subject are determined from the two or more images, and the subject is identified based at least in part on the one or more motion signatures. The motion signatures can be, for example, gait signatures. In certain implementations, one or more anthropometric measurements of the subject are determined from the two or more images, and the subject is identified based at least in part on the one or more anthropometric measurements. For example, the subject can be identified based at least in part on an anthropometric measurement of a portion of the body that is concealed by clothing.

Another disclosed embodiment is an imaging system comprising a two-dimensional antenna array that includes a plurality of antenna elements. The antenna array of this embodiment is dimensioned to transmit electromagnetic radiation to a human subject moving on foot in front of the antenna array and to receive a portion of the transmitted electromagnetic radiation reflected by the human subject. The imaging system of this embodiment further includes a transceiver system coupled to the antenna array. The transceiver system of this embodiment includes a switching system configured to selectively activate one of the antenna elements for transmission and another one or more of the antenna elements for reception and to produce image data based on the received portion. The transceiver system of this embodiment further includes a processing system coupled to the transceiver system and configured to receive the image data from the transceiver system. In this embodiment, the processing system is further configured to render one or more images from the image data and to identify the human subject based at least in part on the one or more images. In certain implementations, the transceiver is configured to generate electromagnetic radiation in a range of about 200 MHz to about 1 THz. The processing system can be further configured to determine one or more anthropometric measurements of the human subject from the one or more rendered images. Further, in some implementations, multiple images are rendered by the processing system, and the processing system is further configured to determine one or more motion signatures of the human subject from the multiple rendered images. The transceiver system of this embodiment can further be configured so that data points corresponding to locations between at least some of the antenna elements of the antenna array are obtained and so that data points corresponding to locations coincident with at least some of the antenna elements of the antenna array are also obtained. In certain implementations, for example, the antenna elements of the antenna array are arranged rectilinearly into rows and columns, and the selective activation of the antenna elements is performed so that (1) at a first time, a first transmission/reception configuration is selected comprising an antenna element in a first column and an antenna element in a second column directly adjacent to the first column; and (2) at a second time, a second transmission/reception configuration is selected comprising the antenna element in the first column and an antenna element in a third column removed from the first column by the second column. A similar switching sequence can be performed between rows of the antenna array instead of the columns.

In another disclosed embodiment, a moving human subject is imaged using electromagnetic radiation that penetrates clothing of the subject but reflects from the body of the subject. In this embodiment, the imaging is performed using a planar antenna array comprising antenna elements respectively spaced from one another by a first distance, and the act of imaging is performed by activating the antenna elements of the antenna array according to a sequence that produces sampling points on the array that are separated from one another by a second distance less than the first distance. The imaging performed in this embodiment can produce, for example, a direct image of the body of the human subject. In certain implementations, the electromagnetic radiation is swept across a range of frequencies, the first distance is approximately one wavelength of a center frequency of the range of frequencies, and the second distance is approximately one-half the wavelength. In some implementations, the imaging is repeated to produce multiple direct images of the human subject. One or more motion signatures of the subject can be determined from the two or more images, and the subject can be identified based at least in part on the one or more motion signatures. In certain implementations, one or more anthropometric measurements of the subject can be determined from the two or more images, and the subject can be identified based at least in part on the anthropometric measurements.

Imaging systems for performing any of the disclosed methods are also disclosed herein. Furthermore, the disclosed imaging, rendering, and analysis methods can be implemented, at least in part, as one or more computer-readable media comprising computer-executable instructions for causing a computer to perform the respective methods. Imaging systems comprising a processing system that executes such computer-executable instructions are also discussed herein and considered to be within the scope of the disclosed technology.

The foregoing and other objects, features, and advantages of the disclosed technology will become more apparent from the following detailed description, which proceeds with reference to the accompanying figures.

DETAILED DESCRIPTION

General Considerations

Figure 1:
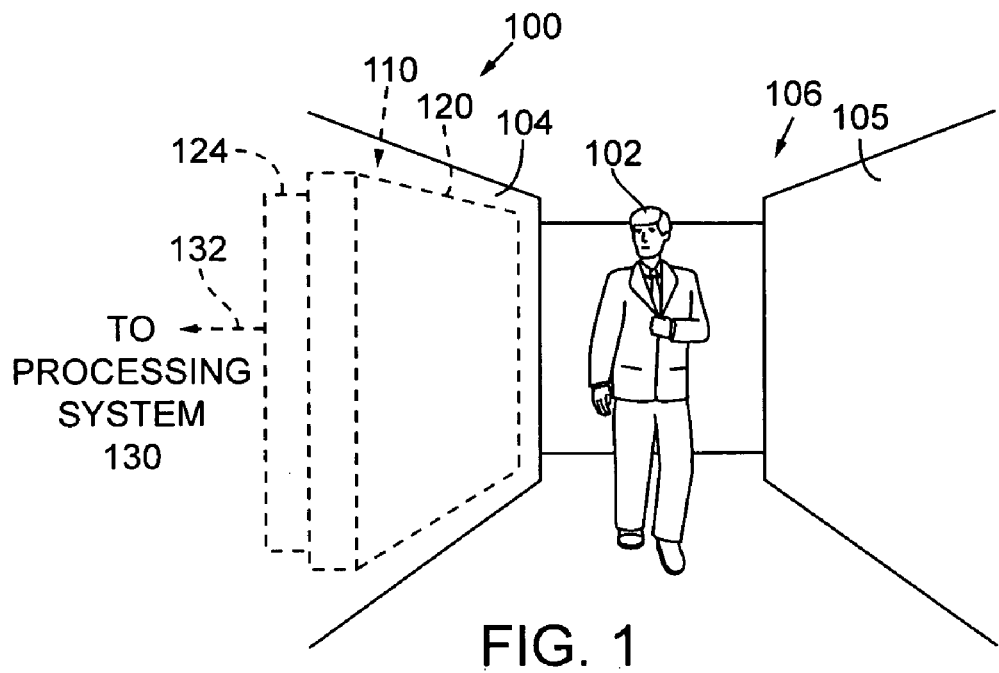
FIG. 1 is a schematic illustration of a first exemplary imaging system according to the disclosed technology.

This application is related to the technology described in U.S. Pat. Nos. 5,455,590; 5,557,283; 5,859,609; 6,507,309; 6,703,964; 6,876,322 and U.S. Published Patent Application Nos. 2004/0140924, 2004/090359, and 2006/0066469, all of which are hereby incorporated herein by reference.

As used in this application and in the claims, the singular forms "a," "an," and "the" include the plural forms unless the context clearly dictates otherwise. Additionally, the term "includes" means "comprises." Further, the term "coupled" means electrically or electromagnetically connected or linked and does not exclude the presence of intermediate elements between the coupled items.

Disclosed herein are exemplary embodiments of imaging systems and methods of using such systems. The disclosed embodiments and methods for using such embodiments described herein should not be construed as limiting in any way. Instead, the present disclosure is directed toward all novel and nonobvious features and aspects, along with their equivalents, of the various disclosed apparatus, methods, and systems alone and in various combinations and subcombinations with one another. The disclosed technology is not limited to any specific aspect or feature, or combination thereof, nor do the disclosed methods and apparatus require that any one or more specific advantages be present or problems be solved.

Although the operations of some of the disclosed methods and apparatus are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods and apparatus can be used in conjunction with other methods and apparatus.

Certain disclosed embodiments include computer-implemented methods (such as computer-implemented imaging or target recognition methods). Such methods can be implemented using software comprising computer-executable instruction stored on one or more computer-readable storage media. Any such software can be executed on a single computer or on a networked computer (for example, via the Internet, a wide-area network, a local-area network, a client-server network, or other such network). For clarity, only certain selected aspects of the software-based implementations are described. Other details that are well known in the art are omitted. For example, it should be understood that the disclosed technology is not limited to any specific computer language, program, or computer. For the same reason, computer hardware is not described in further detail.

Further, any of the images or identification results produced at least in part by the disclosed systems can be stored as information on one or more computer-readable media. For example, one or more files containing images of a human subject produced using the disclosed systems can be created and stored on the one or more computer-readable media.

Overview of Exemplary Imaging Systems

FIG. 1 is a schematic block diagram illustrating an exemplary embodiment of an imaging system 100 according to the disclosed technology. In particular, FIG. 1 shows a corridor 106, such as a hallway at an entrance of a building or at an entrance to a secured area. A human subject 102 is shown walking through the corridor 106. In the illustrated embodiment, a portion of an imaging system 100 according to the disclosed technology is shown. In particular, an antenna/transceiver system 110 is shown. The antenna/transceiver system 110 comprises a stationary planar antenna array 120 and a transceiver system 124. In FIG. 1, the antenna array 120 and the transceiver system 124 are disposed so that they are located behind the front of the wall 104 of the corridor 106 and are not visible to the human subject 102. Although a single two-dimensional array is shown in FIG. 1, the imaging system 100 may include one or more additional arrays, such as an additional array in the wall 105 opposite the wall 104 of the corridor 106. Furthermore, in other embodiments, the corridor may be designed to force the subject to walk alone along a particular path (e.g., a serpentine path), thereby exposing additional surfaces of the individual to other antenna arrays that can be appropriately located along the path.

The exemplary antenna array 120 comprises a plurality of antenna elements (not shown) configured to transmit and/or receive electromagnetic radiation used to image the human subject 102. In the illustrated embodiment, the transceiver system 124 is coupled to the antenna array 120 and is operable to generate and route electromagnetic radiation to and from selected antenna elements via a switching network (not shown). In certain embodiments of the disclosed technology, for example, electromagnetic radiation having a wavelength between 200 Megahertz (MHz) and 1 Terahertz (THz) is transmitted from and received by the antenna array 120. Furthermore, in particular embodiments of the disclosed technology, the transceiver system 124 and the antenna array 120 operate as a bistatic system—that is, the transceiver system 124 operates to transmit a signal from a single respective antenna element of the antenna array 120 and operates to receive a signal at a different single antenna element of the antenna array 120. In other embodiments, the antenna array 120 and the transceiver system 124 can operate as a monostatic system or can transmit from two or more antenna elements and/or receive at two or more antenna elements.

As more fully discussed below, the transceiver system 124 typically outputs an analog signal corresponding to the signal received at the selected antenna element of the antenna array 120. In the illustrated embodiment, this data signal is output to a processing system 130 via a communications link 132. Additional data may also be transmitted, such as data indicative of the antenna element at which the data was received, the corresponding transmit frequency, and/or other such relevant data. As more fully explained below, the processing system 130 can be configured to receive the incoming data, to create image data sets corresponding to the data obtained from the antenna elements, and to generate images of at least a portion of the human subject 102 from the data sets. Depending on the implementation, the antenna array 120, the transceiver system 124, and the processing system 130 can transmit and receive data at a rate sufficient to produce real-time or near real-time image sequences of the subject. For example, embodiments of the imaging system can capture images at a rate of two image data sets (or frames) per second or higher (for example, 10 frames per second up to about 30 frames per second). In particular embodiments, the series of images produced from the image data sets can be analyzed to determine the identity of the subject being imaged. For instance, biometrics (such as anthropometric measurements) that are characteristic of the particular human subject can be used to identify the subject. Further, the biometrics used to identify the subject can be dynamic in nature, and may include for example the subject's gestures, gait, posture, and other such characteristic body movements.

Figure 2:
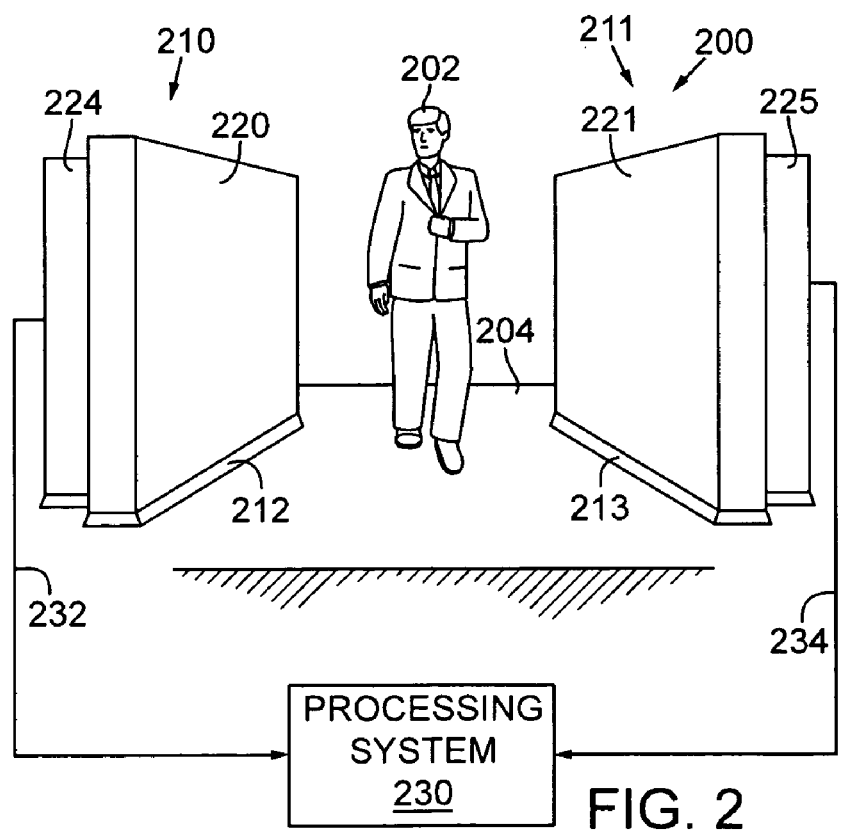
FIG. 2 is a schematic illustration of a second exemplary imaging system according to the disclosed technology.

FIG. 2 is a schematic block diagram illustrating another exemplary imaging system 200 according to the disclosed technology. In FIG. 2, the imaging system 200 is a freestanding system comprising first and second transceiver/array systems 210, 211, each comprising respective antenna arrays 220, 221 and transceiver systems 224, 225. (It should be noted that although two two-dimensional arrays are shown in FIG. 2, the imaging system 200 may include just one such array or additional arrays, depending on the implementation). The transceiver/array systems 210, 211 of the illustrated embodiment are supported by base portions 212, 213, which are configured to position the antenna arrays 220, 221 into stationary positions in the desired imaging plane and at a desired distance from floor 204. Further, in certain embodiments, the base portions 212, 213 can include wheels or another suitable mechanism for allowing the transceiver/array systems 210, 211 to be moved and/or adjusted.

As above, the antenna arrays 220, 221, comprise respective antenna elements (not shown) configured to transmit and/or receive electromagnetic radiation used to image a target object (typically, a human subject, such as human subject 202) positioned between the antenna arrays 220, 221. The transceiver systems 224, 225 are operable to generate and route electromagnetic radiation to the antenna elements of the antenna array 220, 221 via respective switching networks (not shown). The antenna arrays 220, 221 and the transceiver systems 224, 225 can operate as a bistatic system, monostatic system, or using two or more antenna elements during transmission and/or reception. The respective data signals and other associated data produced by the transceiver systems 224, 225 and corresponding to the reflected signals received at selected antenna element(s) are output from the transceiver systems 224, 225 and input into a processing system 230 via a communication links 232, 233. Similar to the system of FIG. 1, the processing system 230 can be configured to receive the incoming data, to create image data sets corresponding to the data obtained from the antenna elements of the arrays 220, 221, and to generate images of at least a portion of the target subject 202 from the data sets. Depending on the implementation, the transceiver/array systems 210, 211 and the processing system 230 can capture data at a rate sufficient to produce real-time or near real-time image sequences of the subject (for example, 2 frames per second or more). As with system 100, the series of images produced from the image data sets can be analyzed to determine the identity of the human subject being imaged.

In general, the systems 100, 200 interrogate an animate or inanimate object with electromagnetic radiation (for example, using a swept frequency) and detect the reflected radiation. The frequency of the radiation can be in the range of 200 MHz to 1 THz, and in particular embodiments, is in the range of 5 GHz to 110 GHz. For example, in one particular implementation, the frequency range of the transmitted electromagnetic radiation is from about 8 GHz to about 12 GHz. The corresponding wavelengths of these frequencies range from several centimeters to a few micrometers (and from 37.5 to 25 millimeters for the exemplary range of 8 to 12 GHz).

Natural and synthetic fibers are typically transparent or semi-transparent to radiation having such wavelengths. Consequently, by using electromagnetic radiation having frequencies in these ranges, surfaces beneath such fibers can be detected and images. For example, even when the subject is fully clothed and covered by additional garments, image information about a subject's unclothed body can be directly obtained by interrogating the subject using such electromagnetic radiation (for example, using millimeter wavelength electromagnetic radiation). Images obtained in this manner are therefore referred to as "direct images" and can show the unclothed body of a clothed individual. Information about objects carried by the person can also be detected and imaged by the systems 100, 200. For instance, metal and nonmetal object compositions (such as those commonly used for weapons and contraband) can be detected and imaged by the systems 100, 200.

Embodiments of the imaging systems 100, 200 can be used for a variety of different applications. The imaging systems 100, 200 can be used, for example, to monitor a corridor or secured area of a building. Other embodiments of the imaging systems can be used to reveal and analyze how a person's body reacts in certain apparel under a variety of circumstances. For instance, embodiments of the imaging systems can be used by shoe manufacturers to directly view how a subject's foot fits within a shoe and reacts during certain activities (for example, running or walking). The disclosed systems can be used to view and analyze the body in other types of sporting apparel as well (for example, football, baseball, or hockey pads). The imaging systems can also be used within the fashion industry to perform fittings of customers without having the customer disrobe or wear a specialized bodysuit (for example, a skin-tight bodysuit). The imaging systems can also be used to perform motion capture operations as are used widely throughout the entertainment industry. For example, embodiments of the imaging system 200 can be used by video game manufacturers to perform markerless motion capture.

Figure 3:
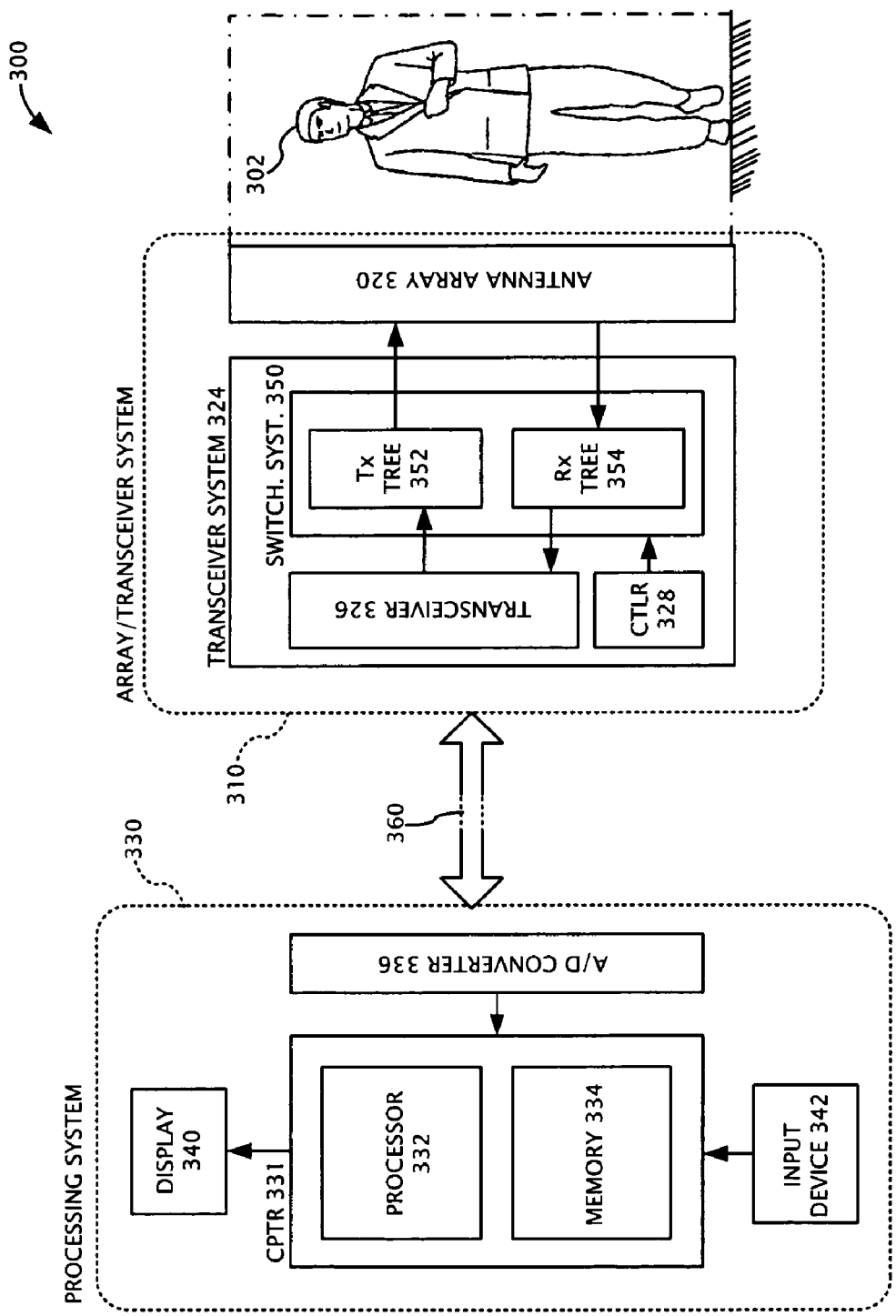
FIG. 3 is a schematic block diagram illustrating the major components of an exemplary imaging system as may be used as the imaging system in FIGS. 1 and 2.

FIG. 3 is a schematic block diagram of an imaging system 300 comprising an array/transceiver system 310 and a processing system 330. The imaging system 300 can be the imaging systems 100, 200 used in FIGS. 1 and 2, respectively. The array/transceiver system 310 comprises an antenna array 320 and a transceiver system 324. The antenna array 320 comprises linearly arranged antenna elements configured to transmit or receive electromagnetic radiation within a selected bandwidth. The antenna array 320 is coupled to the transceiver system 324, which comprises a transceiver 326, an antenna array controller 328, and a switching system 350 coupled to the elements of the antenna array 320. In certain embodiments, the antenna controller 328 selectively controls which one or more of the antenna elements in the antenna array 320 are currently configured to transmit the signal from the transceivers 326 and which one or more of the antenna elements in the antenna array 320 are currently configured to receive the reflected signal and have the signal routed to the transceiver 326. The array controller 328 can operate according to a desired array sequence (discussed below) and can include one or more positional encoders used to identify the currently activated element(s).

Under the control of the array controller 328, individual antenna elements of the antenna array 320 are selectively activated by the switching system 350. In the illustrated system, the switching system 350 comprises a transmission switching tree 352 for activating antenna elements for transmission and a reception switching tree 354 for activating antenna elements for reception. In certain embodiments, the antenna elements of the antenna array 320 are dedicated to transmission or reception, though in other embodiments, the elements are used for both transmission and reception. Array controller 328 typically includes logic to direct activation of the antenna elements of the antenna array 320 according to one or more predetermined sequences, thereby providing a scan of a target, such as person 302. Suitable sequences for the antenna array 320 are discussed in more detail below. Further embodiments of the antenna array 320 are provided in U.S. Pat. No. 5,859,609, which is hereby incorporated by reference.

In certain embodiments, the transceiver system 324 and the antenna array 320 are configured to transmit and/or receive electromagnetic radiation selected from the range of about 200 MHz to about 1 THz. In particular implementations, the transceiver system 324 and the antenna array 320 are configured to generate frequencies in more narrow ranges, such as about 5 GHz to about 110 GHz, or about 8 GHz to 12 GHz.

The transmission pathway for a given antenna element of the antenna array 320 can be configured to be approximately the same length as the reception pathway for corresponding antenna elements in order to simplify calibration. In embodiments in which the elements of the antenna array 320 are used for both transmission and reception, the lengths of the transmission/reception pathways can similarly be balanced.

The transceiver 326 of the transceiver system 310 is coupled to the switching system 350 and typically comprises a microwave circuit configured to generate a wideband signal (for example, using a voltage controlled oscillator (VCO)) and to transmit the wideband signal to an antenna element of the antenna array 320 as selected by the switching system 350. The transceiver 326 is further configured to receive and process the reflected signal received at a corresponding one or more antenna elements of the antenna array 320 as also routed by the switching system 350. Typically, for example, the signals received from the antenna array 320 are downshifted in frequency during operation and converted into a processible format. For instance, the received signal (typically a millimeter-wave frequency signal) is desirably down-converted to a low-frequency (baseband) signal. For example, any of the processing techniques and transceiver configurations known in the art can be used.

The transceiver 326 can be bistatic (connected to separate antenna elements for transmit and receive operations) or monostatic (connected to the same antenna elements for transmit and receive operations). The transceiver 326 can also have a homodyne or heterodyne configuration. Moreover, the transceiver 326 can output an in-phase signal (I), a quadrature signal (Q), or both. The transceiver 326 is desirably configured so that the signal output from the transceiver 326 contains information about the magnitude and the phase of the reflected signal. The transceiver 326 can further comprise electronic components readily known to those skilled in the art (for example, oscillators, balanced mixers, low pass filters, amplifiers, and other such well-known components). An exemplary embodiment of a bistatic heterodyne transceiver suitable for use in system 300 of FIG. 3 is described in further detail below with respect to FIG. 12. Other suitable transceiver configurations include, but are not limited to, those described in U.S. Pat. Nos. 5,859,609, 5,557,283, and 5,455,590, which are incorporated herein by reference. In other embodiments, a mixture of different transceiver/sensing element configurations with overlapping or nonoverlapping frequency ranges can be utilized that may include one or more of the impulse type, monostatic-homodyne type, bistatic-heterodyne type, and/or such other type as known or would be known to those skilled in the art.

In FIG. 3, data corresponding to the received array signals is provided to a processing system 330 via a communication link 360 and digitized by an analog-to-digital converter 336. In other embodiments, the array/transceiver system 310 includes the analog-to-digital converter 336 so that the signal is digitized before being output from the system. The communication link 360 can be a direct connection between the systems 310, 330 or can be through a suitable network. The processing system 330 can be remotely located relative to the array/transceiver system 310, and may be coupled to multiple remotely located array/transceiver systems 310.

The processing system 330 further comprises a computer 331 that comprises one or more memory components 334. The memory components 334 can be of a solid-state variety, electromagnetic variety, optical variety, or a combination of these forms. Furthermore, the memory components 334 can be volatile, nonvolatile, or a mixture of these types. Moreover, one or more of the memory components 334 can be at least partially integrated with processor 332. One or more of the memory components 334 can be removable, such as removable electromagnetic recording media, removable optical discs (such as CD-ROMs or DVDs) or nonvolatile solid-state types of memory (such as memory cards or sticks comprising Flash memory).

The processing system 330 further comprises one or more processors 332. Processor 332 can comprise one or more components of any type suitable to process the data received from the array/transceiver system 310. For example, the processor 332 can comprise one or more application-specific integrated circuits (ASICs) (including mixed-signals ASICs), systems-on-a-chip (SoCs), programmable logic devices (PLDs) such as field programmable gate arrays (FPGAs), or combinations thereof. The processor 332 can also be of a multiple processor form, thereby allowing distributed, pipelined, and/or parallel processing to be utilized as appropriate.

The processing system 330 of FIG. 3 is further configured to selectively control operation of the array/transceiver system 310. For example, the processing system 330 can send control signals to the array/transceiver system 310 that activate the system 310 to initiate scanning operations, control the bandwidth of the transceiver 326, control the array controller 328 and the transceiver 326 to adjust the switching speed of the switching system 350, and/or control the array controller 328 to select a desired antenna element or series of antenna elements in the antenna array 320. The processing system 330 can further comprise one or more input devices 342 and one or more display devices 340. The input device(s) 342 can include, for example, a keyboard, mouse or other pointing device, and/or other suitable arrangement known in the art. Display device(s) 340 can be of a Cathode Ray Tube (CRT) type, Liquid Crystal Display (LCD) type, plasma type, or other suitable type known in the art.

In operation, the processor 332 can execute computer-readable instructions stored on one or more computer-readable media (such as any of the memory components 334 described above) that cause the processor 332 to perform an image rendering procedure that produces an image of an object from an image data set collected from the outputs of the transceiver 326. The image data set can comprise the digitized data from the transceiver 326 and correspond to the signals received during a full sequence of antenna element transmissions and receptions at the antenna array 320. In certain embodiments of the disclosed technology, the image data sets from the antenna array 320 are produced at a rate of two data sets (or frames) per second or higher. For example, the rate of image capturing can be 10 frames per second up to about 30 frames per second. (Note that in certain embodiments, the data sets are created at a faster rate than image rendering can be performed, in which case the data sets can be stored in memory of the processing system 330 for later processing). As a result of the image rendering process, a sequence of images indicative of the motion of the object through the aperture of the antenna array 320 can be obtained. According to certain embodiments of the disclosed technology, the processor 332 can further execute computer-readable instructions stored on one or more computer-readable media (such as any of the memory components 334) that cause the processor 323 to perform a biometric analysis of the rendered images (for example, an analysis of a single image or a dynamic analysis of two or more images).

Any portion of the image rendering or biometric analysis procedure can be performed in a networked computer environment. For example, in certain embodiments, a first computer system (for example, a server) can be coupled to the array/transceiver system 310 and store the digitized image data sets on one or more memory components. A second computer system can communicate with the first computer system and receive one or more of the image data sets and perform the image rendering procedure and/or the dynamic analysis procedure. In further embodiments, the image rendering and/or biometric analysis can be performed by multiple processors or computer systems in communication with the first computer system.

Exemplary Antenna Arrays

Figure 4:
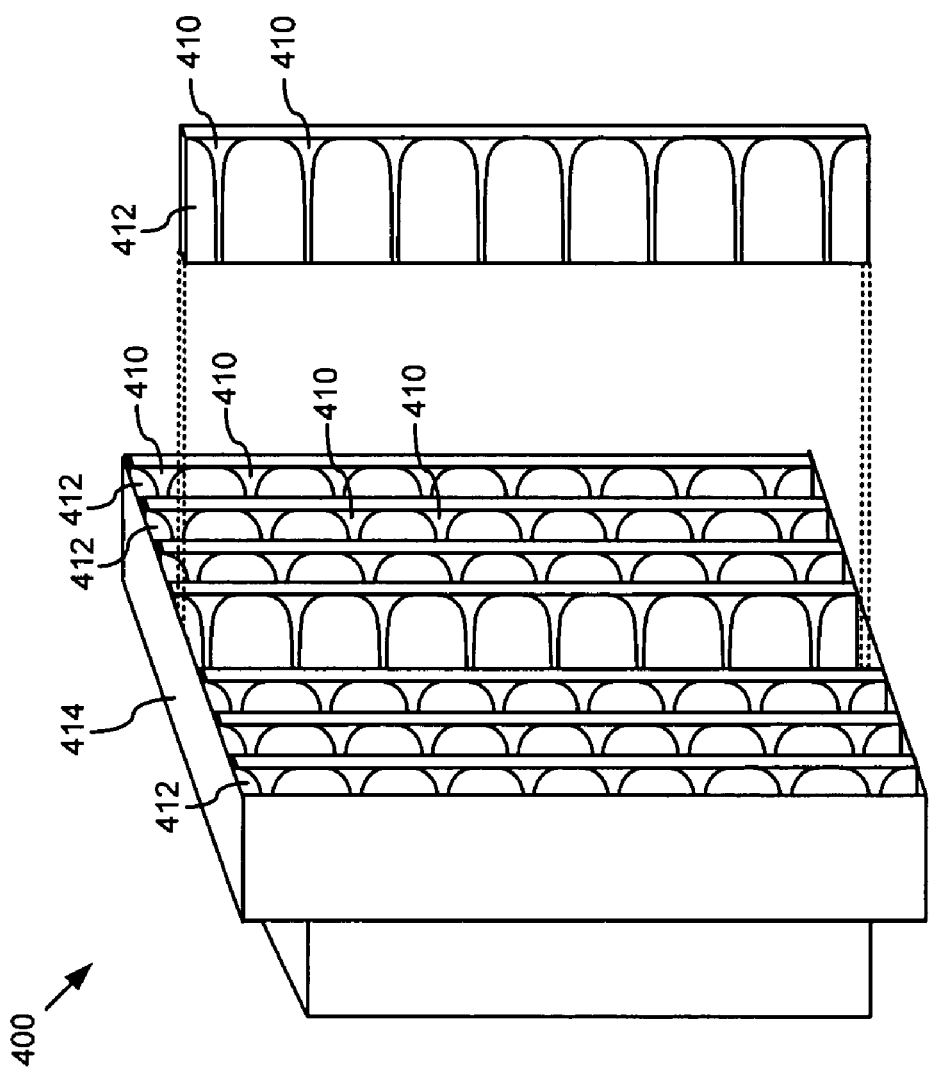
FIG. 4 is a schematic block diagram of an exemplary antenna array as may be used in the imaging system of FIG. 3.

In this section, embodiments of antenna arrays that can be used in the disclosed imaging systems (such as the antenna array 320 in FIG. 3) are described in further detail. FIG. 4 is a schematic block diagram of an exemplary antenna array 400. The exemplary antenna array 400 comprises antenna elements 410 disposed on vertically oriented boards 412, one of which is shown separated from the antenna array 400 for illustrative purposes. In the illustrated example, antenna elements 410 comprise slot-line antennas fabricated onto respective boards 412, which are made of printed circuit board material and are manufactured using printed-circuit-board fabrication techniques. Thus, the illustrated antenna array 400 comprises eight boards 412, each having eight antenna elements 410 positioned substantially equidistant from one another, located within an array housing 414.

In the exemplary antenna array 400, antenna elements 410 are arranged rectilinearly along the face of the antenna array 400, thereby forming a two-dimensional array. The antenna elements 410 are sometimes referred to as being arranged into rows and columns, though it should be understood that reference to a row or a column does not require the antenna elements to be aligned horizontally or vertically, respectively. Instead, antenna elements in a row can be aligned on an axis angularly translated from the horizontal axis (for example, by as much 90 degrees) and antenna elements in a column can be aligned on an axis angularly translated from the vertical axis (for example, by as much 90 degrees). The antenna elements 410 can also be arranged in other "regular" configurations or in an irregular configuration. Furthermore, although the antenna array 400 is shown as a planar array, the array may have some radius of curvature in some implementations. For example, the array may be semi-cylindrical, but still have antenna elements arranged rectilinearly across the face of the array.

The shape of the antenna elements 410 will vary from implementation to implementation depending on the construction and nature of the antenna element. For example, antenna elements 410 can comprise a variety of antenna types, including, for example, slot line, patch, endfire, waveguide, dipole, or any combination thereof. The antenna elements 410 can be of any length, but are typically sized to achieve desirable performance characteristics in the bandwidth of operation (for example, 8-12 GHz).

The antenna array 400 can vary in size. (for example, from dimensions on the order of centimeters to dimensions on the order of meters). In one exemplary embodiment, for instance, the antenna array 400 is about 2 meters by 2 meters. Although the illustrated arrays described herein are generally square in shape, other shapes are possible, such as rectangular, circular, or elliptical arrays.

The number of antenna elements 410 in the antenna array 400 can vary from implementation to implementation. For example, embodiments of the disclosed technology can have a small number of antenna elements (around 16) or a relatively large number (around 256 or higher). The embodiment illustrated in FIG. 4, for example, has 64 antenna elements 410.

As noted above, in embodiments of the system 300, the antenna array 400 is configured to operate in connection with a bistatic transceiver. In such embodiments, signals are transmitted from an antenna element 410 of the antenna array 400 configured for transmission (generally referred to herein as a "transmit antenna element" or denoted "T"), and reflected signals are received by an antenna element 410 configured for reception (generally referred to herein as a "receive antenna element" or denoted "R")

The center-to-center spacing of the antenna elements 410 on the antenna array 400 can vary from implementation to implementation, but in certain embodiments is selected so as to achieve a desired wideband performance in the system 300. For example, to meet the Nyquist sampling criteria, an aperture is desirably sampled at least every one-half wavelength. According to certain embodiments of the disclosed technology, the antenna elements 410 are separated from one another by about one wavelength of the center bandwidth frequency, and half-wavelength sampling is achieved by using specialized switching sequences (discussed below). The center-to-center spacing can vary from about 0.25 to about 3 wavelengths depending on the implementation and the particular frequency of operation. Other factors that may affect the spacing between the antenna elements 410 and that can be appropriately analyzed by those skilled in the art include the antenna gain, beam width, possible aliasing in the imaging due to undersampling of a high spatial frequency target, and mutual coupling problems between the antenna elements 410. In a particular embodiment, the system 300 is configured for wideband operation using a frequency-modulated (FM), continuous-wave (CW) bistatic heterodyne transceiver with a 4 GHz frequency sweep between 8 and 12 GHz, and the antenna elements are separated from one another by about 3 cm. In such an embodiment, the effective imaging range of the antenna array is from about 10 cm to about 3 m, though this range will vary from implementation to implementation and may be smaller (for example, about 1.5 m) or larger (for example, about 10 m).

Antenna beam width may range from about 10 degrees to about 180 degrees. It is generally preferred that the beam width of the antenna range from about 10 degrees to about 50 degrees, and in particular embodiments is about 30 degrees. By increasing the antenna beam width, the gain of the antenna is decreased, which can decrease sensitivity to reflected target signals. In addition, increasing the antenna beam width can create mutual coupling problems between antennas in linear and two-dimensional holographic arrays.

The maximum number of antenna elements 410 is generally determined by the frequency of the array 400 and the desired size of the array 400. In general, the higher the frequency of operation of the imaging system, the more antenna elements 410 will be incorporated into the antenna array 400. However, the ability to increase the antenna elements 410 is further limited by the structures and electrical components used to couple the antenna elements 410 to the switching system of the antenna/transceiver system. Further, certain antenna elements 410 as may be used in the antenna array 400 (such as polyrod antennas) are coupled to waveguides that limit how closely the antenna elements 410 can be spaced.

Exemplary Switching Systems

In order to provide high-speed sampling of the antenna array, millimeter-wave switching is generally used in the disclosed imaging systems. In certain embodiments, one or more of the antenna elements in the antenna arrays can be individually connected to the transceiver of the imaging system and configured for either transmission or reception. In certain embodiments, the switching connections comprise single-pole double-throw (SPDT) switches. For example, in an exemplary embodiment comprising 64 antenna elements, a binary-tree switching system is used in which the switching system is comprised of single-pole double-throw (SPDT) switch elements. In this exemplary structure, the input is fed into a SPDT module, which in turn drives two SPDT modules. The four outputs of these two SPDT elements can then drive four SPDT elements, and so on, until the desired number of outputs is obtained. The number of switches used in a two-dimensional antenna array according to this exemplary design can generally be calculated by:

$$N_s = m(n-1) + (m-1) = mn - 1, \quad (1)$$

where $N_s$ is the number of SPDT switches, m is the number of boards, and n is the number of antenna elements per board. For example, for an antenna array having 64 antenna elements (eight boards each having eight antenna elements), 63 SPDT elements are used for the array.

Using just SPDT elements can result in an array that is quite bulky, making it difficult to arrange the antenna elements in the antenna array with the desired spacing. Accordingly, a more compact switching system can be used with the transceiver of the imaging system. For example, according to certain embodiments of the disclosed technology, single-pole 8-throw (SP8T) switching modules are used in the imaging system.

Figure 5:
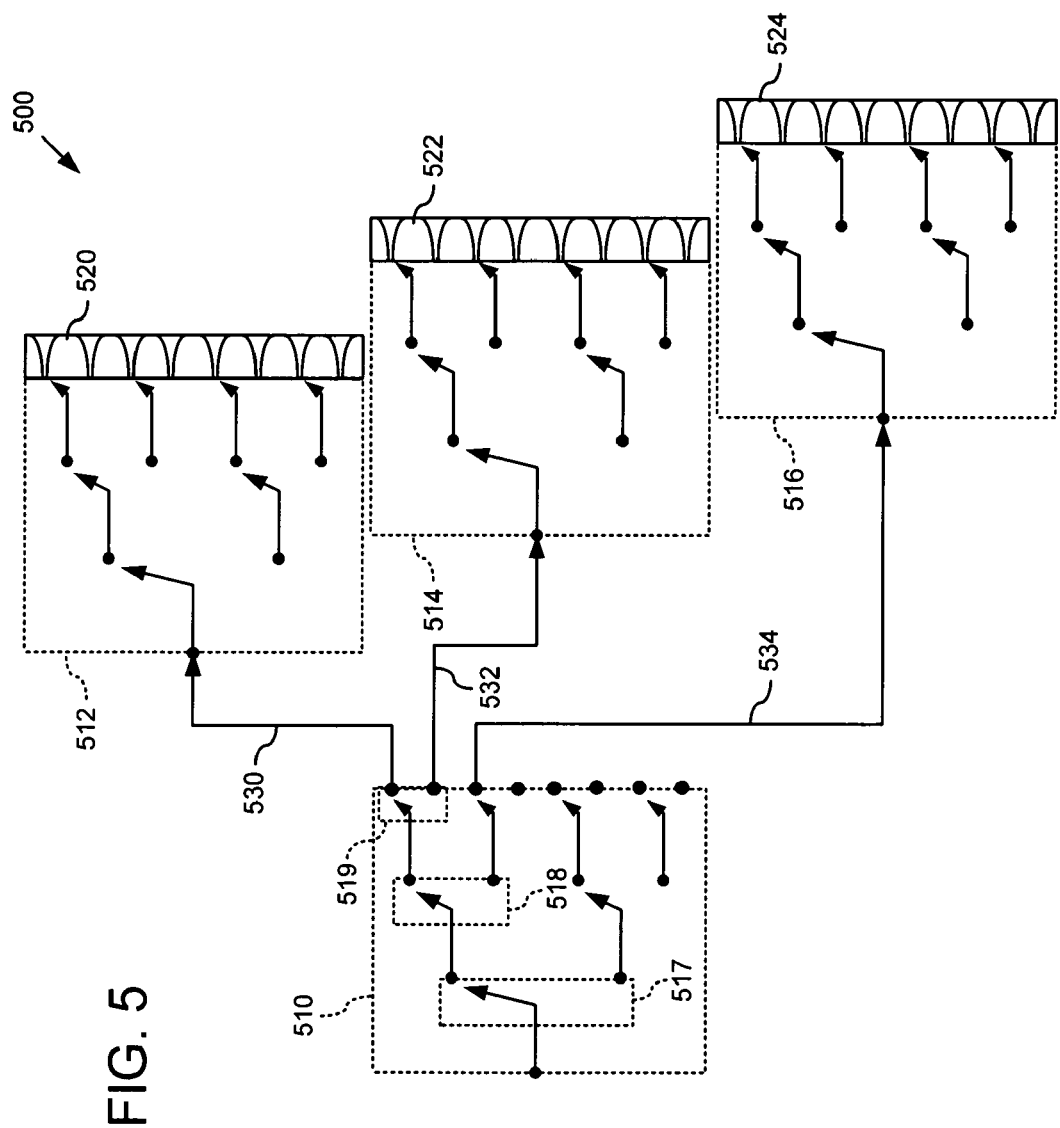
FIG. 5 is a schematic block diagram of a portion of a switching system as may be used in the imaging system of FIG. 3.

FIG. 5 shows an exemplary embodiment of a portion 500 of a switching system comprising SP8T switch modules coupled to exemplary boards of an antenna array. In particular, FIG. 5 shows four SP8T switch modules 510, 512, 514, 516, coupled to three boards 520, 522, 524 of antenna elements. (In FIG. 5, the antenna array actually has eight boards of antenna elements for a total of 64 antenna elements; only 24 antenna elements are shown for ease of illustration.) The exemplary SP8T switch modules 510, 512, 514, 516 use a binary-tree structure composed of three layers of SPDT switch elements. Three such SPDT switch elements 517, 515, 519 are highlighted in SP8T switch module 510, one for each of the three layers. Thus, according to the illustrated embodiment, each of the exemplary SP8T switch modules 510, 512, 514, 516 comprises a total of seven SPDT elements. In particular embodiments, the SP8T modules 510, 512, 514, 516 are constructed of aluminum using a split-block waveguide structure. The SPDT elements (such as SPDT elements 517, 515, 519) can comprise a variety of components, but in certain embodiments comprise a duroid fin-line printed circuit junction which uses shunt pin-diodes to direct the millimeter-wave signal to the desired output waveguide. The pin-diodes of these embodiments can be controlled by electronic driver circuitry (not shown) mounted in a housing on top of the split-block waveguide structure.

As shown in FIG. 5, the SP8T switch modules 510, 512, 514, 516 are connected by interconnections 530, 532, 534 (for example, coaxial cables) to form the exemplary portion 500 of the switching system. The exemplary portion 500 of the switching system can be coupled to the transmission output of the transceiver, the reception input of the transceiver, or both (for example, via another selectively controlled one or more SPDT switches) in order to provide the desired switching capabilities of the antenna array. Although a switching system for a 64 antenna-element array is illustrated in FIG. 5, the components described above can be combined to form antenna arrays having other numbers of antenna elements (for example, 128, 256, or any other number).

Further, although the switching modules were described as being single-pole-8-throw switching modules, other numbers of outputs from the switching modules can be obtained (for example, single-pole 4-throw, single-pole 16-throw, or any other number of outputs from the switching module). Indeed, using various combinations and subcombinations of the principles described above, any number of switching system outputs for connection to antenna elements can be obtained. Furthermore, although a binary-tree switching system has been described above, other switching systems, such as a comb-type transmission-line-sequential switching array with appropriate wiring and control adjustments, can also be used:

Exemplary Switching Sequences

Imaging in the near field (close to the target) typically requires one-quarter to one-half wavelength spatial sampling to prevent aliasing. This can be difficult to achieve with antenna elements (for example, with 10 db gain) in a two-dimensional array without creating undesirable interference between the antenna elements that can result in undesirable aliasing effects. To reduce the interference and improve the signal-to-noise ratio, and according to particular embodiments of the disclosed technology, the antenna elements of the antenna array are separated from one another by approximately one wavelength at the center bandwidth frequency. In specific embodiments having a center bandwidth frequency of 10 GHz, for instance, the antenna elements of the antenna array are separated from one another by about 3 cm. In these embodiments, sub-wavelength sampling can be obtained by using specialized switching schemes (for example, using particular transmit/receive configurations to obtain an image across the antenna array). These switching schemes can be used, for example, to obtain one-half wavelength sampling using full wavelength antenna element spacing.

Figure 6:
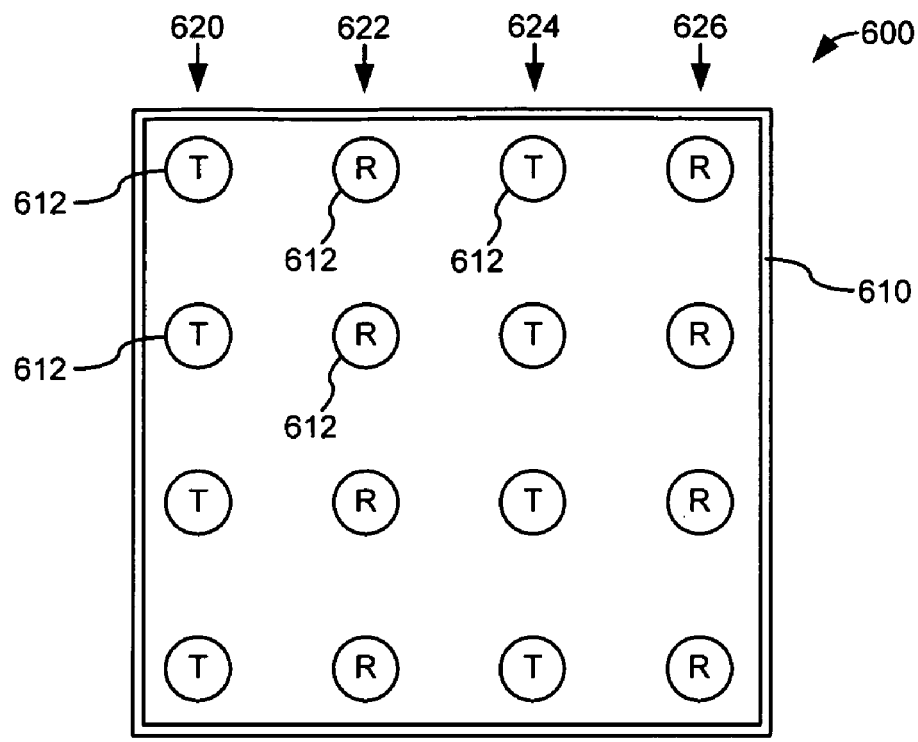
FIG. 6 is a schematic block diagram of an exemplary antenna array as may be used with any of the disclosed imaging systems.

FIG. 6 is a schematic block diagram 600 of an exemplary two-dimensional antenna array 610 that is used to illustrate embodiments of switching schemes as can be used to obtain improved sampling. For ease of illustration, the exemplary antenna array 610 shows only sixteen antenna elements 612 arranged into columns 620, 622, 624, 626. Moreover, the spacing between the exemplary antenna elements 612 is shown schematically and may not correspond to the actual spacing of the antenna elements. Likewise, the antenna elements 612 are shown as being circular for illustrative purposes only and are not intended to precisely depict the shape of the antenna element. For clarity, antenna elements 612 that are configured during transmission for the illustrated time frame are labeled "T" and antenna elements 612 that are configured for reception are labeled "R." Further, although FIGS. 6-10 show multiple configurations of transmit and receive antenna elements 612 being activated, it should be understood that the transmission/reception operation is typically performed one pair at a time (for example, in a bistatic mode), such that one transmission antenna element "T" and one receive antenna element "R" are simultaneously activated. In other embodiments, however, multiple receive antenna elements are simultaneously activated with a single transmit element in order to more quickly perform scanning across the antenna array to obtain the data points illustrated in FIGS. 6-10. Such embodiments typically require one or more additional receivers to down convert the additional received signals.

The time period for performing a transmission/reception operation varies from implementation to implementation, but in one particular embodiment is on the order of microseconds (for example, about 12 microseconds). Furthermore, and depending on the construction of the antenna array and the switching system for the antenna array, the ability of individual antenna elements to perform as a transmit or a receive element may be limited. For example, in the illustrated embodiment, it is assumed that transmitting and receiving on the same column is not allowed. Such a limitation can occur, for example, when the antenna array is constructed of vertical boards of antenna elements as shown in the exemplary embodiment of FIG. 4. In other embodiments, transmitting and receiving on the same row may not be allowed, or no restrictions on antenna element activation may exist.

Figure 7:
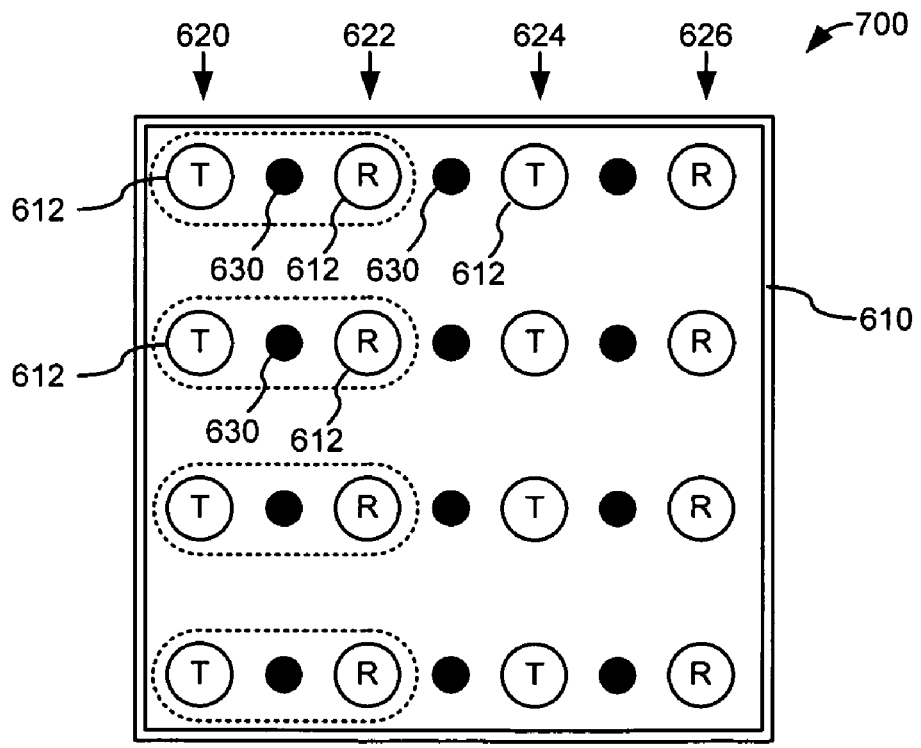
FIG. 7 is a schematic block diagram of the exemplary antenna array of FIG. 6 operating according to a first transmission/reception sequence.

A first exemplary switching sequence is illustrated in schematic block diagram 700 of FIG. 7. In diagram 700, antenna elements 612 of the first column 620 are configured for transmission and antenna elements 612 of the adjacent second column 622 are configured for reception (equivalently, antenna elements 612 of the first column 620 can be configured for reception and antenna elements of the adjacent second column 622 can be configured for transmission) and a transmission/reception configuration is formed from antenna elements in the same row. The transmission/reception configurations between the first and second columns are shown by dashed lines in FIG. 7 (for purposes of clarity, the antenna element configurations between the second and third columns and between the third and fourth columns are not shown in dashed lines). Consequently, this column to column switching generates effective sampling points (shown as points 630) halfway between the activated transmit and receive elements. These effective sampling points (also referred to herein as "data points") correspond to locations on the array where the data appears to have been obtained using, for example, a single idealized transmission/reception element. Because of the bistatic nature of the exemplary system, however, the sampling point can instead be viewed as being between the two active elements. As shown, data points 630 corresponding to locations between each of the columns can be obtained in this manner. The sequence of operation can vary, but in one embodiment comprises sequentially activating (for example, from top to bottom) the antenna element configurations between the first column 620 and the second column 622, sequentially activating (for example, from top to bottom) the antenna element configurations between the second column 622 and the third column 624, sequentially activating (for example, from top to bottom) the antenna element configurations between the third column 624 and the fourth column 626.

Figure 8:
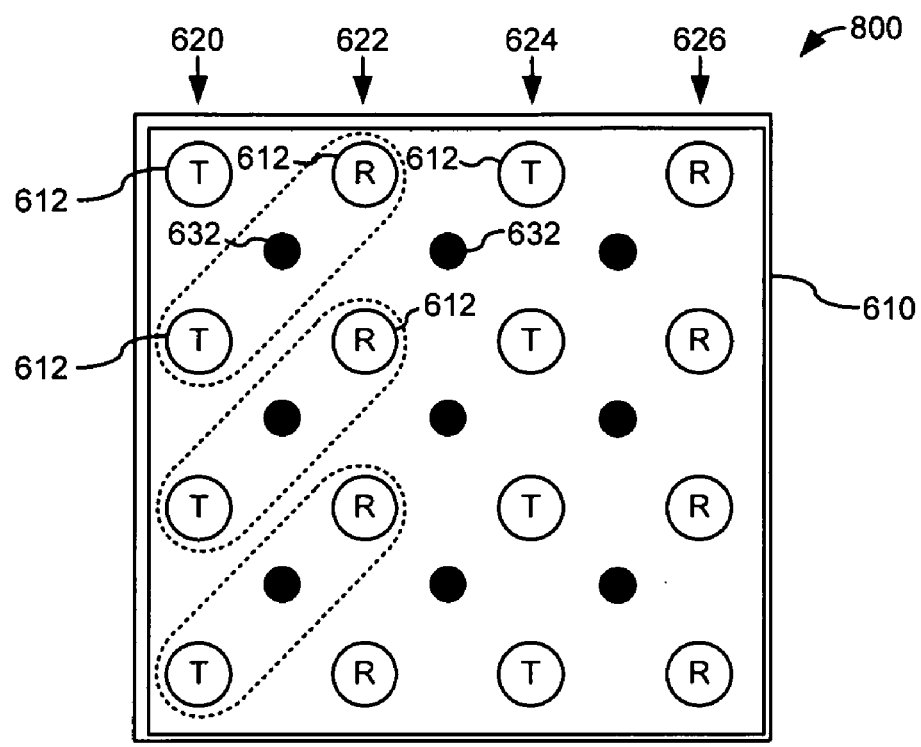
FIG. 8 is a schematic block diagram of the exemplary antenna array of FIG. 6 operating according to a second transmission/reception sequence.

A second exemplary switching sequence is illustrated in schematic block diagram 800 of FIG. 8. In diagram 800, antenna elements 612 of the first column 620 are configured for transmission and antenna elements 612 of the adjacent second column 622 and in an adjacent row are configured for reception (equivalently, antenna elements of the first column 620 can be configured for reception and antenna elements of the adjacent second column 622 and in an adjacent row can be configured for transmission). The transmission/reception configurations between the first and second columns are shown by dashed lines in FIG. 8 (for purposes of clarity, the antenna element configurations between the second and third columns, and between the third and fourth columns are not shown in FIG. 8). Consequently, this antenna element switching generates data points (shown as points 632) corresponding to locations between two columns and between two rows. Data points corresponding to locations along the diagonals between the antenna elements can be obtained in this manner. The sequence of operation can vary, but in one embodiment comprises sequentially activating (for example, from top to bottom) the antenna element configurations between the first column 620 and the second column 622, and sequentially activating (for example, from top to bottom) the antenna element configurations between the second column 622 and the third column 624, and sequentially activating (for example, from top to bottom) the antenna element configurations between the third column 624 and the fourth column 626.

Figure 9:
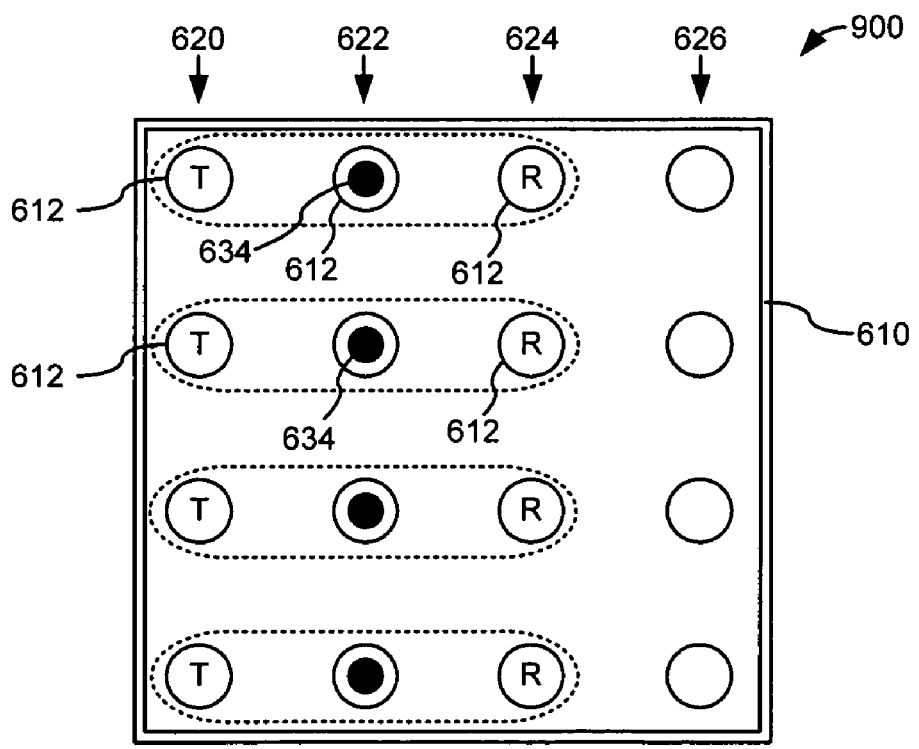
FIG. 9 is a schematic block diagram of the exemplary antenna array of FIG. 6 operating according to a third transmission/reception sequence.

A third exemplary switching sequence is illustrated in schematic block diagram 900 of FIG. 9. In diagram 900, antenna elements of the first column 620 are configured for transmission and antenna elements of the third column 624 located two columns away and in the same row are configured for reception. The transmission/reception configurations between the first and third columns are shown by dashed lines in FIG. 9 (for purposes of clarity, the antenna element configurations between the second and fourth columns and the data points generated in this configuration are not shown in FIG. 9). Consequently, this antenna element switching generates data points (shown as points 634) corresponding to locations between the activated transmit and receive elements of the same row, specifically at a location corresponding to an inactive antenna element on the row. In this switching sequence, the data points correspond to locations in the column between the two columns of the transmission/reception configuration. Again, the sequence of operation can vary, but in one embodiment comprises sequentially activating (for example, from top to bottom) the antenna element configurations between the first column 620 and the third column 624, and sequentially activating (for example, from top to bottom) the antenna element configurations between the second column 622 and the fourth column 626.

Figure 10:
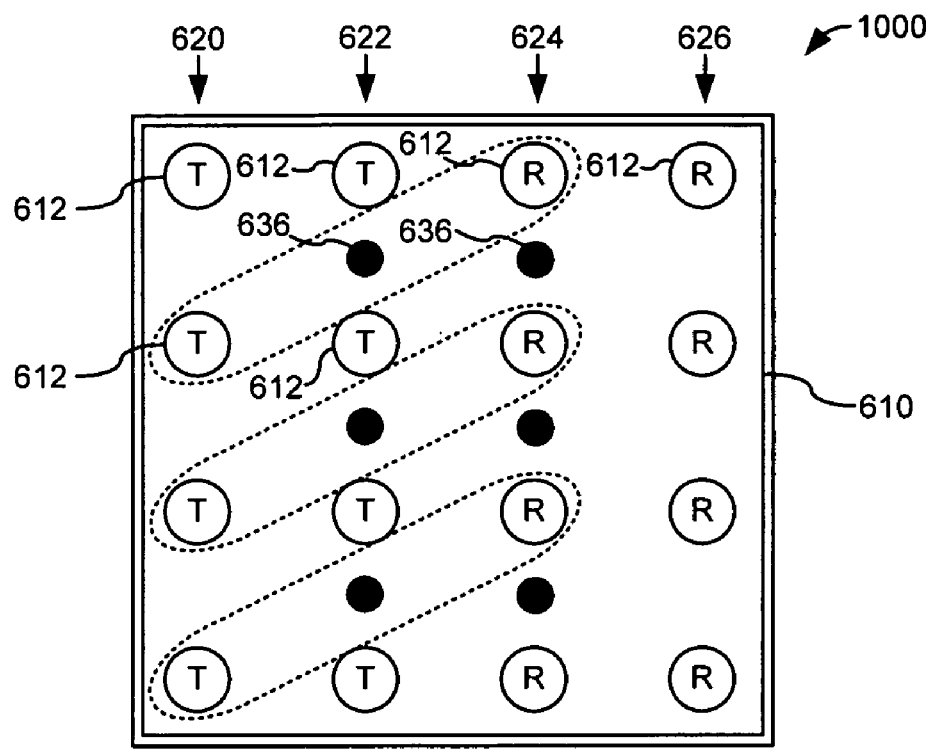
FIG. 10 is a schematic block diagram of the exemplary antenna array of FIG. 6 operating according to a fourth transmission/reception sequence.

A fourth exemplary switching sequence is illustrated in the schematic block diagram 1000 of FIG. 10. In diagram 1000, antenna elements of the first column 620 are configured for transmission and antenna elements in the third column 624 located two columns away and in an adjacent row are configured for reception (equivalently, antenna elements of the first column 620 can be configured for reception and antenna elements in the third column 624 and in an adjacent row can be configured for transmission). The transmission/reception configurations between the first and third columns are shown by dashed lines in FIG. 10 (for purposes of clarity, the antenna element configurations between the second and fourth columns are not shown in FIG. 10). Consequently, this antenna element switching generates data points (shown as points 636) corresponding to locations between the activated transmit and receive elements of the columns and between the two rows. Data points corresponding to locations along the diagonals between antenna elements separated by an intermediate column can be found in this manner. The sequence of operation can vary, but in one embodiment comprises sequentially activating (for example, from top to bottom) the antenna element configurations between the first column 620 and the third columns 624, and then sequentially activating (for example, from top to bottom) the antenna element configurations between the second column 622 and the fourth column 626.

Figure 11:
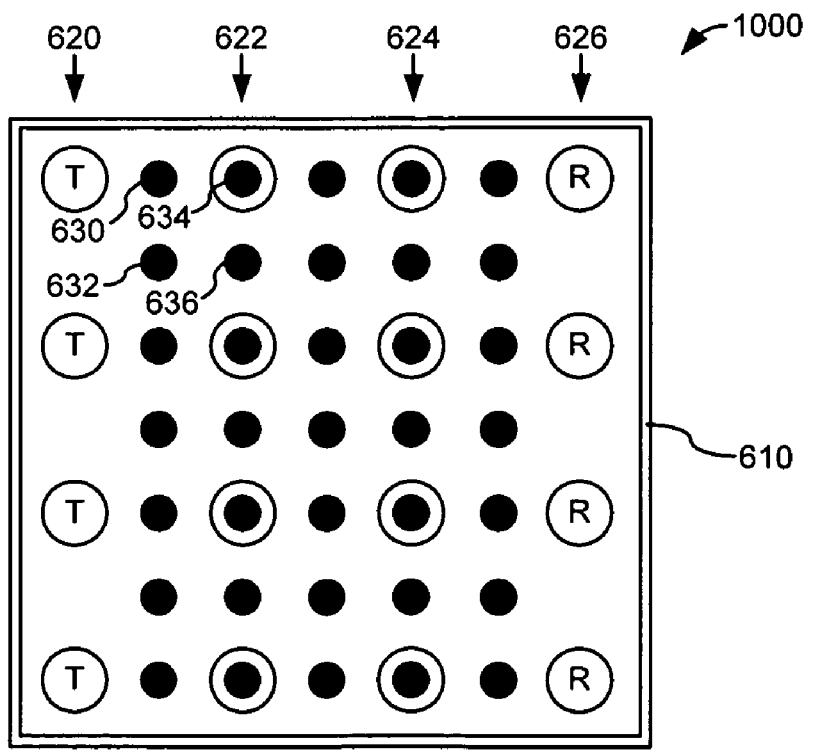
FIG. 11 is a schematic block diagram of the exemplary antenna array of FIG. 6 illustrating data points that can be obtained using the exemplary sequence portion shown in FIGS. 7-10.

If the four exemplary switching sequences are performed, data points corresponding to the locations shown in FIG. 11 can be obtained. As seen in FIG. 11, the final result can be a matrix of data points corresponding to locations on the array 610 that are separated by about one-half of the antenna element spacing. Thus, if the antenna elements are spaced from one another by a full wavelength, one-half wavelength sampling can be obtained using the exemplary switching sequences described above. Furthermore, FIG. 11 illustrates that data points corresponding to locations between the antenna elements of the antenna array can be obtained as well as data points corresponding to locations coincident with the antenna elements of the antenna array using embodiments of the disclosed switching techniques.

In general, the number of data points (N) that can be obtained using embodiments of the exemplary switching sequences for a square array is given by:

$$N = (2n-1)(2n-3), \tag{2}$$

where n is the number of elements in a row or column. For the exemplary 4-by-4 array shown in FIGS. 6-11, N=(2(4)−1)(2(4)−3)=(7)(5)=35.

Exemplary Transceivers

Figure 12:
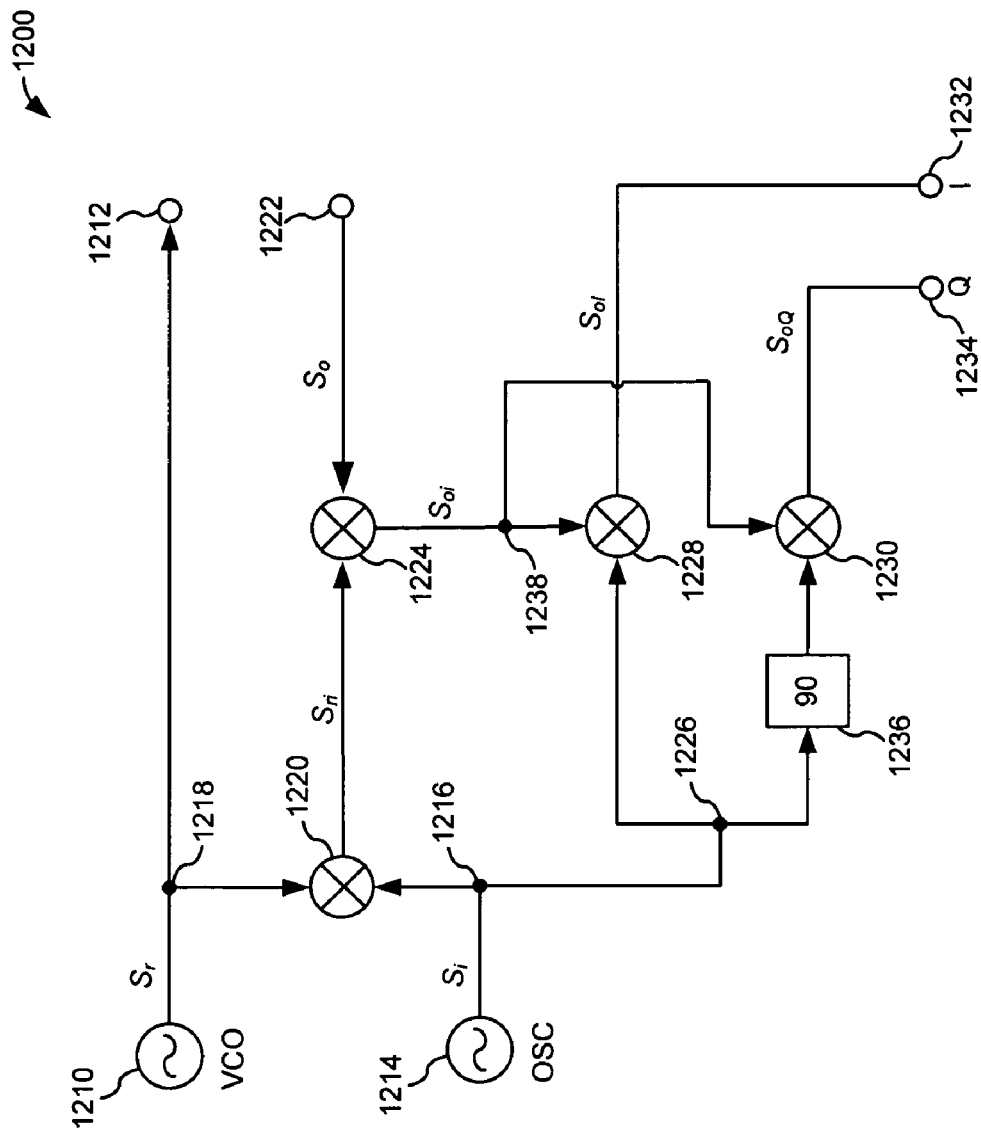
FIG. 12 is a schematic block diagram of an exemplary transceiver as may be used in the imaging system of FIG. 3.

As noted above, a variety of different transceiver configurations can be used in embodiments of the disclosed technology. One of the possible configurations is transceiver configuration 1200 shown in FIG. 12. It should be understood that the configuration 1200 shown in FIG. 12 is simplified for illustrative purposes and does not show some of the transceiver components that would be present in an actual implementation. These components are readily known to one skilled in the art (for example, appropriate amplifiers, filters, and the like).

In configuration 1200, one or more high frequency voltage controlled oscillators (VCOs) 1210 provide the desired sweep frequency to transmission output 1212, which is coupled to the switching system of the imaging system for appropriate routing to the antenna elements of the antenna array. In the illustrated embodiment, the high frequency VCO 1210 provides a sweep frequency between about 8 and about 12 GHz. In the illustrated embodiment, a low frequency oscillator (OSC) 1214 provides a fixed intermediate frequency (for example, 70 MHz) that is independent of the high frequency VCO 1210. The output from the low frequency OSC 1214 is divided by a splitter 1216, and a first portion of the split signal is mixed at mixer 1220 with a portion of the output from the high frequency VCO 1210 from splitter 1218. The output from the mixer 1220 is mixed at mixer 1224 with the signal received at the received signal input 1222. The second portion of the split signal from the splitter 1216 is directed to a final mixing section, where the signal is split again at splitter 1226 and mixed to produce the in-phase signal (I) at in-phase output node 1232 and the quadrature signal (Q) at the quadrature output node 1234. In particular, a portion of the signal from the splitter 1226 is mixed at mixer 1228 with the signal from the mixer 1224 to produce the in-phase signal (I) and the other portion of the signal from the splitter is phase delayed by 90 degrees by delay element 1236 and mixed at mixer 1230 with the signal from the mixer 1224 (via splitter 1238) to produce the quadrature signal (Q) at the quadrature output node 1234.

With reference to an exemplary signal ($S_r$) that can be transmitted and received from the exemplary configuration 1200, the signal ($S_t = A_t \cos \omega t$) is transmitted to the transmission output 1212. From the transmission output 1212, the signal is transmitted from the activated transmission element of the antenna array via the switching system and propagates to the target (typically, a person). The reflected signal is received at the activated receive antenna element of the antenna array after a delay travel time of $$\tau = \frac{2R}{c},$$

where R is the distance to the target and c is the velocity. The received signal is coupled via the switching system to the received signal input 1222. The received signal ($S_o = A_o \cos(\omega t + \phi_o)$) contains the target's reflectivity information in both phase ($\phi_0$) and amplitude ($A_0$). The signal processing continues with the intermediate reference signal ($S_{ri} = A_i A_r \cos(\omega - \omega_i)t$) being mixed with the received signal at the mixer 1224. The intermediate reference signal contains the intermediate frequency (IF) and is generated by mixing the VCO 1210 and OSC 1214 signals at the mixer 1220 and filtering the difference signal. The mixing of the transmitted signal ($S_o$) and the intermediate reference signal ($S_{ri}$) at the mixer 1224 generates the target signal $S_{oi} = kA_o \cos(\omega_i t + \phi_o)$ at the (IF) frequency. This signal is then processed at the lower (IF) frequency to generate wide band holographic in-phase and quadrature signals. Specifically, the final mixing occurs in the in-phase (0 degree) mixer 1228 and the quadrature (90 degree) mixer 1230 using the (IF) frequency reference signal ($S_i = A_i \cos \omega_i t$). The final processed holographic signals are the in-phase signal ($S_{oI} = KA_0 \cos \phi_0$) at in-phase output node 1232 and the quadrature signal ($S_{oQ} = KA_0 \sin \phi_0$) at the quadrature output node 1234. The in-phase signal and the quadrature signal contain the target's amplitude ($A_0$) and phase information ($\phi_0$). Note that in this exemplary heterodyne configuration, the target's amplitude and phase of the original high frequency received signal ($S_o = A_o \cos(\omega t + \phi_o)$) can be recorded in terms of the two low frequency signals. The phase and amplitude can be calculated using the following:

$$\phi_0 = \tan^{-1}\left[\frac{\text{quadrature signal}}{\text{in-phase signal}}\right], \text{ and} \tag{3}$$

$$A = \frac{1}{K}\sqrt{S_{oI}^2 + S_{oQ}^2}. \tag{4}$$

As explained below, the in-phase and quadrature signals output at the in-phase output node 1232 and the quadrature output node 1234, respectively, can be processed in order to produce an image of the target.

The exemplary transceiver configuration 1200 shown in FIG. 12 is referred to herein as a bistatic, heterodyne, in-phase, non-tracking transceiver, where non-tracking refers to the VCO/fixed oscillator combination. Such a configuration may be used, for example, in order to reduce hardware costs because a fixed oscillator (such as fixed oscillator 1214) is typically much less expensive than a normal voltage-controlled oscillator, and the need for coordinating tracking between two VCOs for the desired IF can be eliminated (for example, linearizing and matching tasks can be eliminated). Moreover, the use of configuration 1200 can help reduce noise from frequency variances that occur when two VCOs are used.

Exemplary Methods of Operation

Figure 13:
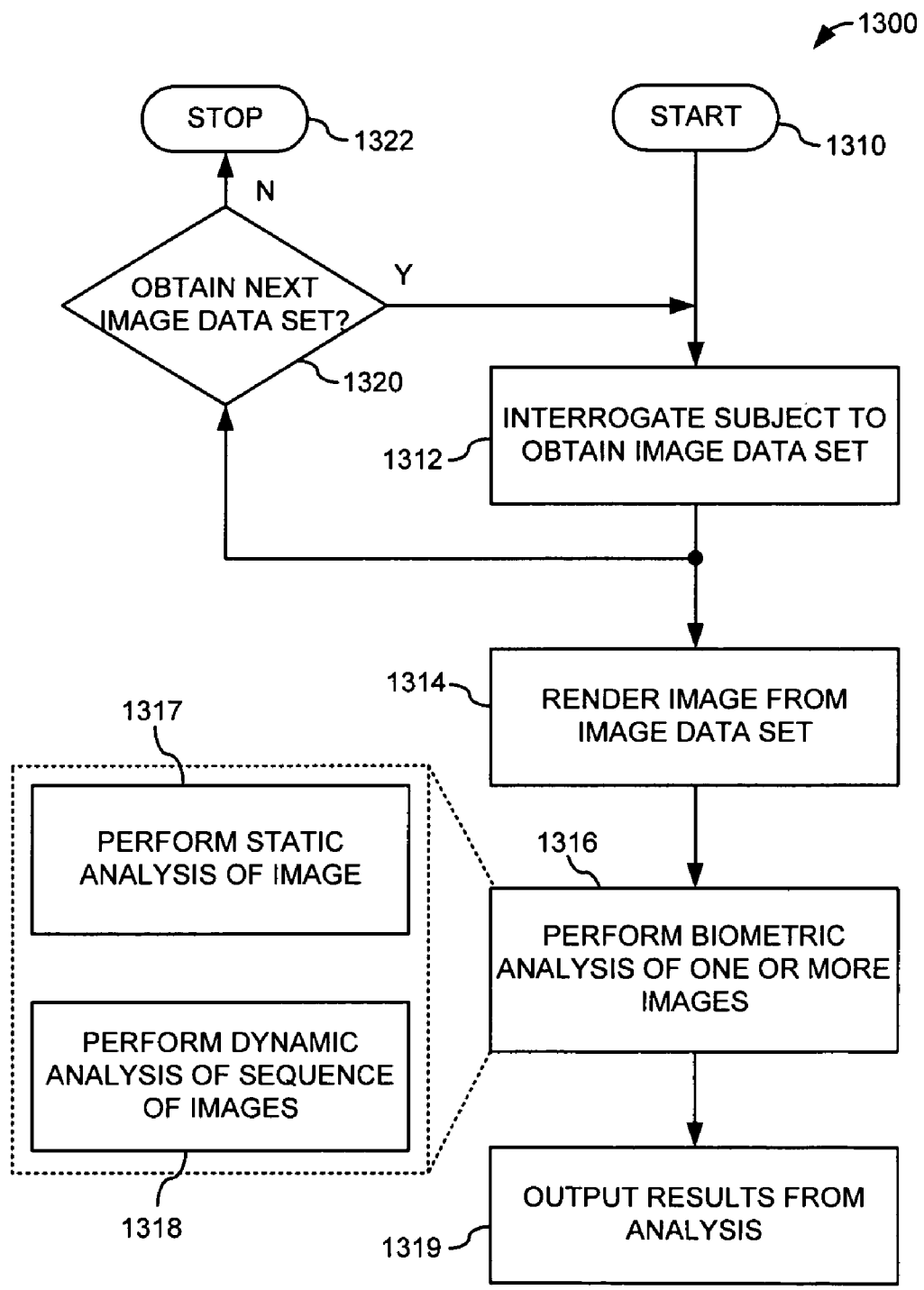
FIG. 13 is a flowchart of an exemplary method of operating the imaging system of FIG. 3.

FIG. 13 is a flowchart showing one exemplary method 1300 for operating an imaging system (such as systems 100, 200, 300). At process block 1310, the exemplary method 1300 is initiated. The exemplary method 1300 can be initiated, for example, whenever an object or person (collectively referred to herein as the "subject") enters into the field of view of the antenna array of the imaging system, whenever an operator initiates the procedure, or according to various other criteria. For example, according to one embodiment, the method 1200 can begin when the subject enters into a portion of a corridor being monitored by an imaging system, such as the imaging system 100 illustrated in FIG. 1.

At process block 1312, the subject or a portion of the subject is scanned by the antenna array in order to obtain an image data set. For example, an image data set can correspond to wideband data obtained by sequentially interrogating the subject using selected antenna element configurations from the antenna array (selected according to a predetermined switching sequence, such as one or more of the sequences described above with respect to FIGS. 6-11). The data obtained can correspond to points across substantially the entire antenna array (for example, corresponding to more than 50%, 75%, 80%, or 90% of the array). Furthermore, for any given data point, multiple samples can be obtained during transmission of the sweep frequency (for example, 8, 16, 32, or any other suitable number).

Figure 14:
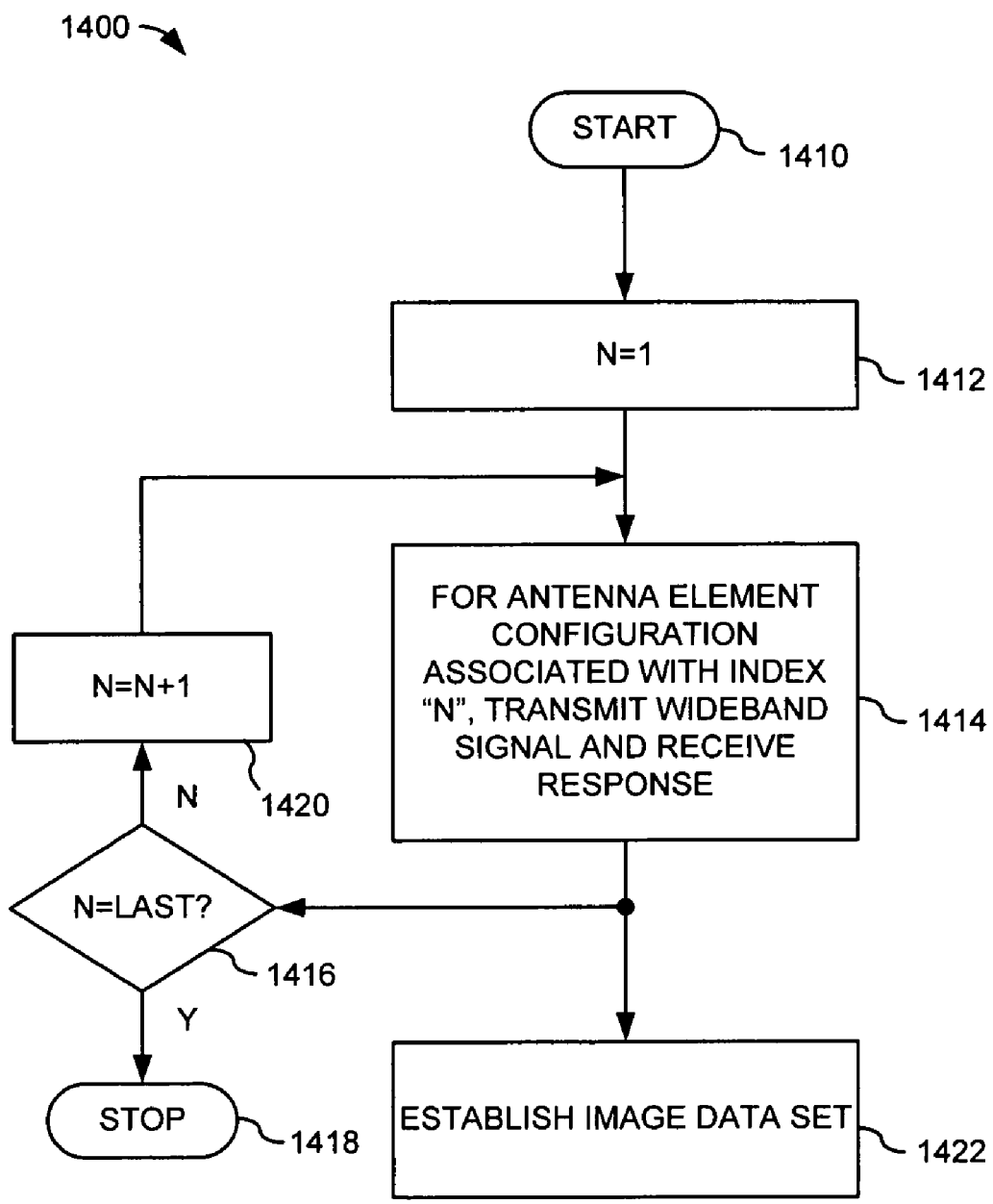
FIG. 14 is a flowchart of an exemplary method of performing the interrogation process in FIG. 13.

FIG. 14 shows one exemplary manner of implementing process block 1312. Specifically, FIG. 14 shows an exemplary scanning procedure 1400 implemented by the antenna array and used to establish an image data set. The exemplary procedure begins at 1410. At process block 1412, a scanning sequence index N is reset (for example, in the illustrated embodiment to "1"). At process block 1414, a transmission/reception operation is performed by selected antenna elements of the antenna array. In particular embodiments, an antenna element configuration (for example, one respective transmit antenna element and one respective receive antenna element) is associated with each value of N. At process block 1414, the antenna element configuration associated with the current value of N is activated via the switching system such that the wideband signal generated by the transceiver can be transmitted from the selected transmit antenna element, and the selected receive antenna element can receive the response thereto. The antenna element configurations can be determined according to a predetermined switching sequence, such as any of the switching sequences discussed above.

As noted above, the signal transmitted can be a wideband signal. For example, the transmitted signal can be linearly swept through a selected frequency range during each operation 1414. In particular embodiments, for example, the transceiver 326 sweeps through a range of about 4 GHz or more during performance of process block 1414. In other embodiments, however, the sweep can be smaller (for example, about 3 GHz). For example, according to one particular configuration, the sweep occurs from 8 to 12 GHz for each operation 1414. In another form, the transmitter can sweep through a given frequency range in a pseudo-random order.

At process block 1416, a determination is made as to whether the scanning sequence index N has reached its last value, corresponding to the last antenna element configuration used during a scanning sequence across the antenna array 320. If the scanning sequence index N has reached its last value, then the procedure 1400 terminates at 1418, otherwise the index N is incremented at process block 1420 and the process 1400 continues with activation of the next antenna element configuration at process block 1414.

In the illustrated embodiment, an image data set associated with the sequence 1400 is established at process block 1422 substantially continuously as the scanning procedure is performed. In particular embodiments, multiple samples of the received signal are recorded and digitized during each frequency sweep for a given antenna element configuration. For example, in certain embodiments, the number of samples per sweep is around 64 or more, though other numbers of samples are possible (2 or more, 16 or more, 32 or more, or other suitable numbers). In general, the bandwidth and number of samples used depends in part on the desired resolution and the range of the imaging system, consistent with the expression $N_f=(4BR)/c$ where $N_f$ is the number of frequencies, B is the bandwidth, R is the range extent or depth, and c is the speed of light. In particular embodiments, a complete image data set corresponds to data from each antenna element configuration in the scanning sequence, and includes data corresponding to the multiple samples at each antenna element configuration. Thus, in these embodiments, the image data set is established once the data from the antenna element configuration associated with the last value of N is obtained.

Returning to the exemplary method 1300 shown in FIG. 13, a determination is made at process block 1320 as to whether a next image data set is to be obtained. This determination can depend, for example, on whether the subject is still within the field of view of the antenna array, whether a desired number of image data sets have already been obtained (which can be preset by a user, for example), or whether the operator indicates that scanning is to continue. Other mechanisms for making this determination can also be used. If additional image data sets are to be obtained, then the method 1300 returns to 1312 and the next data set is obtained by scanning the target again (which may have moved slightly from when the previous data set was obtained). Otherwise, the method 1300 terminates at 1322.

In certain embodiments of the disclosed technology, the image data sets from process block 1312 are produced at a rate of two image data sets per second or higher. For example, the rate of image capturing can be 10 frames per second up to about 30 frames per second.

The data forming the image data set can be substantially continuously transmitted to the processing system as it is created. The processing system can then perform additional processing or store the image data set for subsequent processing. For example, in certain embodiments, the data sets are created at a faster rate than image rendering at process block 1314 can be performed, in which case the data sets can be stored in memory of the processing system for later processing. Alternatively, the array/transceiver system can be configured to store the data corresponding to the image data set and subsequently transmit it for later processing.

At process block 1314, an image is rendered from the image data set established during process block 1312. The rendering procedure can be performed by the processor(s) of the processing system and according to computer-readable instructions stored on one or more computer-readable media.

A variety of image rendering techniques can be performed to reconstruct the data obtained from the antenna array into an image of the target. Exemplary procedures for rendering the image are described below with respect to FIG. 16. The rendered image typically comprises an image of the portion of the subject that reflects the transmitted electromagnetic signals. For example, if the target is a fully clothed person, the image will be a direct image of the person's body, as the clothing will not ordinarily reflect the transmitted signals. An example of a rendered image 1700 produced at process block 1314 is shown in FIG. 17.

In certain embodiments of the disclosed technology, the rendered image can be analyzed by an object detection procedure in order to determine whether one or more objects of interest (for example, a concealed weapon or other contraband) are present on the target. For example, if the target is a clothed person, these objects of interest may be completely or partially concealed by the clothing of the person. Numerical processing of the image can be performed in order to detect the desired objects. For example, any of the concealed object detection techniques described in U.S. Patent Application Publication U.S. 2004/0140924 can be used. In certain embodiments, the number and characteristics of concealed objects carried by a person can be automatically inventoried as the person enters a restricted area. When leaving the area, a similar analysis can be performed, producing information that can be compared to the original information in order to detect the possible removal of property from the restricted area.

At process block 1316, one or more of the images resulting from process block 1314 are analyzed using a biometric analysis procedure. For example, a single image can be analyzed for anthropometric indicators that identify the target (process block 1317), or two or more images can be analyzed for dynamic indicators (for example, one or more motion signatures) that identify the subject (process block 1318), or a combination of these techniques can be used.

At process block 1317, for example, one or more anthropometric measurements from the rendered image can be identified and used to identify the person's identity. Among the possible anthropometric measurements that can be used are the person's height, the length, width, and height of various body parts, as well as various joint-to-joint and other measurements that can be identified from the rendered image and that are indicative of a person's identity. After appropriate processing, one or more of these anthropometric measurements identified can be compared against a database of biometric measurements for known individuals (for example, individuals having clearance to a secured area) and a matching procedure can be performed to determine the identity of the person. Exemplary biometric analysis techniques are described in further detail below.

Figure 18:
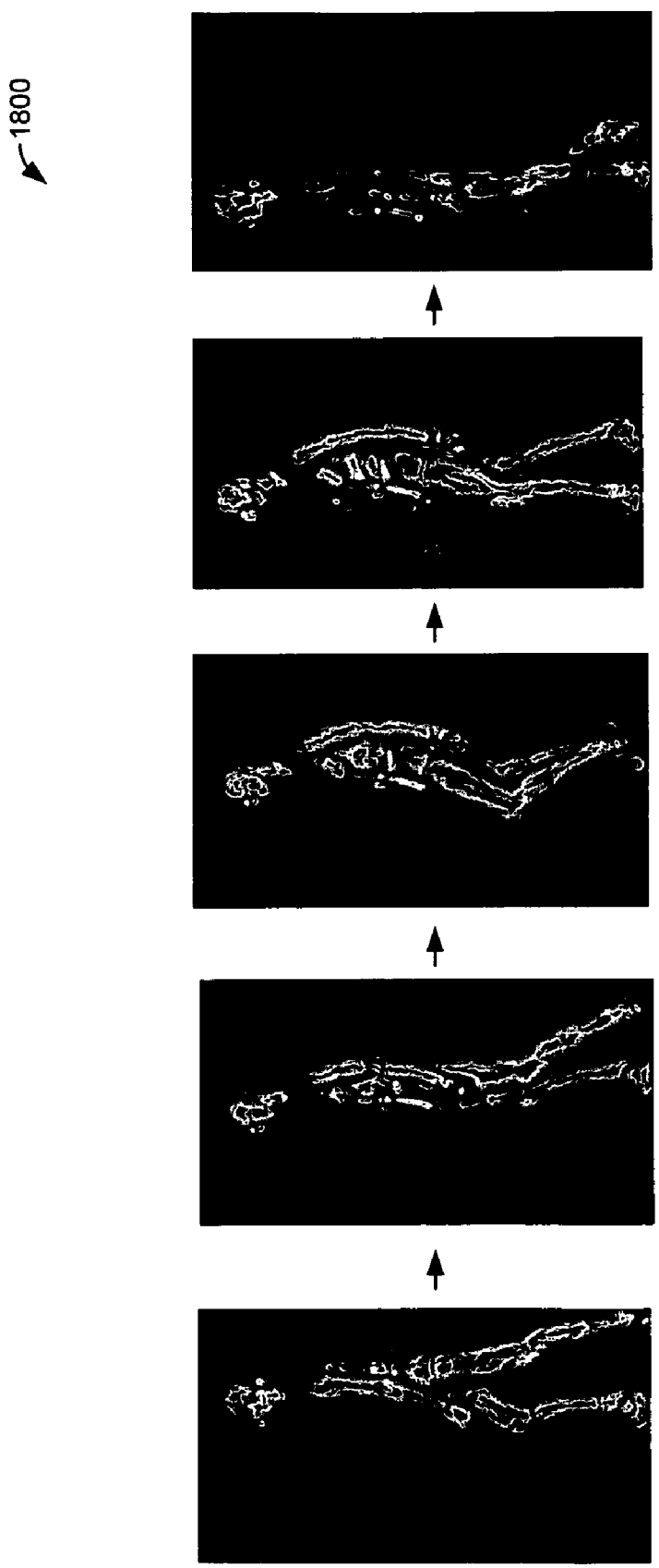
FIG. 18 shows a sequence of exemplary images as can be obtained using embodiments of the disclosed technology.

At process block 1318, for example, two or more of the images resulting from process block 1314 can be analyzed using one or more dynamic analysis procedures. The two or more images that are analyzed typically correspond to sequential images obtained at process block 1312 and rendered at process block 1314. Thus, in this exemplary embodiment, the two or more images are substantially equivalent to frames of a video sequence of the target moving across the aperture of the antenna array. An example of a sequence of images 1800 as can be produced by rendering multiple image data sets using an exemplary embodiment of the disclosed technology is shown in FIG. 18. Exemplary dynamic analysis techniques as may be used at process block 1318 are described in further detail below.

At process block 1319, the results of the dynamic analysis are output. For example, one or more of the rendered images can be displayed on a display of the processing system, along with an indication of the identity of the target. In other embodiments, and in order to address privacy concerns associated with imaging person's bodies, a representation of the target (for example, a silhouette, mannequin, wire-frame body, or other gender-neutral representation of the target) can be displayed along with an indication of the identity of the target is displayed. Further, the images can be displayed in a sequence in order to show the dynamic movement of the target through the antenna array. In still other embodiments, an image of the target may be only partially shown. Visual and/or audible alert signals can also be generated to focus the operator's attention on the person undergoing inspection and/or a corresponding image. Additionally or alternatively, information pertaining to the identification of the target can be displayed in text or graphic form for operator consideration.

Exemplary Image Rendering Procedures

The image rendering procedure can be performed using a variety of different procedures. One exemplary procedure is described below, which begins with a discussion of the derivation of the procedure.

Figure 15:
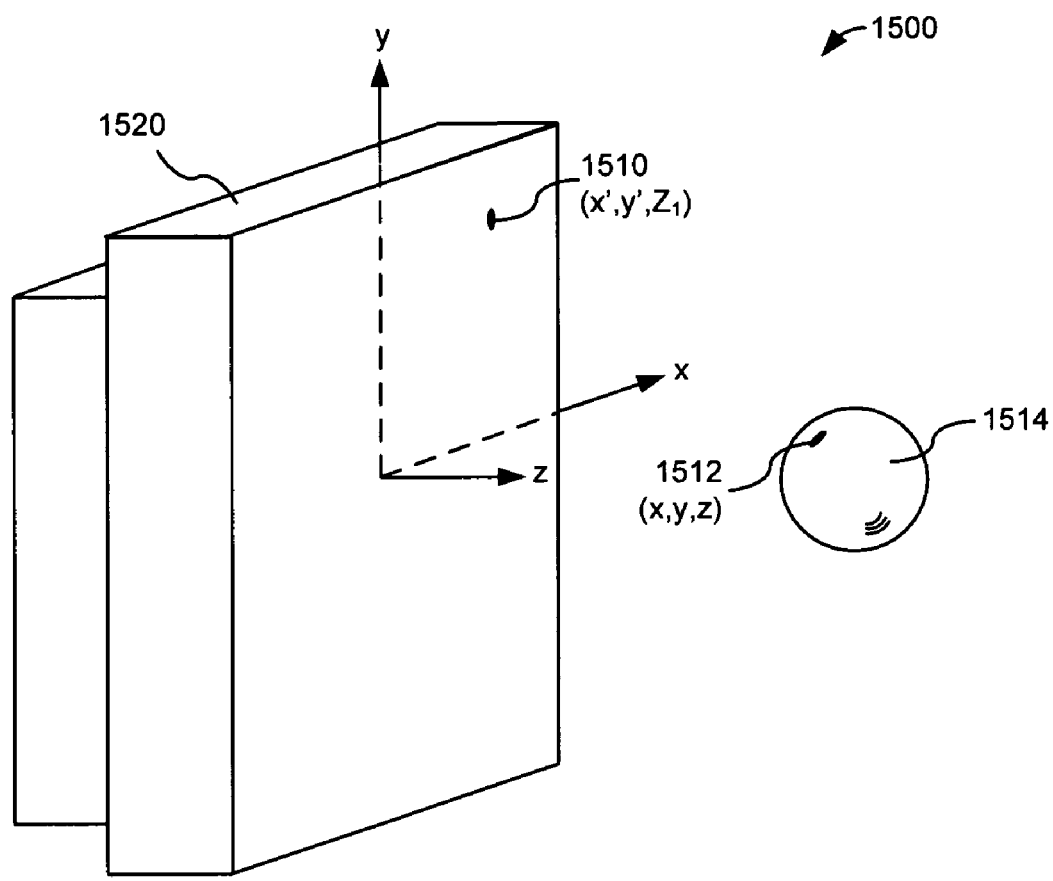
FIG. 15 is a block diagram of an exemplary coordinate system used to explain the exemplary rendering process of FIG. 16.

FIG. 15 is a schematic diagram 1500 illustrating the coordinates as used in this discussion relative to the aperture of an exemplary antenna array 1520. In FIG. 15, the primed coordinates represent the transceiver position 1510, and the unprimed coordinates represent a target point 1512 on the target 1514. If the target 1514 is characterized by a reflectivity function, $f(x, y, z)$, then the response measured at the transceiver position 1510 will be the superposition of the reflectivity function times the round trip phase to the target 1514. The measurement plane (not shown) is at $z=Z_1$, which is typically negative. The round-trip phase is:

$$2k\sqrt{(x-x')^2+(y-y')^2+(z-Z_1)^2} \qquad (5)$$

The response measured at the transceiver position 1510 is:

$$s(x', y', \omega) = \int\int\int f(x, y, z) e^{-j2k\sqrt{(x-x')^2+(y-y')^2+(z-Z_1)^2}} \, dx\, dy\, dz \qquad (6)$$

where $k=\omega/c$ is the wavenumber, and the amplitude decay with range is not considered since it will have little impact on focusing the image. If needed, amplitude decay with range may be compensated for in the raw data by applying a numerical gain to the data from the transceiver. The numerical gain increases with range.

Alternatively, the data could be collected in the time domain. In this case, the data in Equation (6) will be obtained by Fourier transforming the received signal $s_t(x', y', t)$, which is the echoed data in the time domain, $$s(x',y',\omega)=FT_{(t)}[s_t(x',y',t)] \qquad (7)$$

The exponential term in Equation (6) represents a spherical wave which is decomposed into an infinite superposition of plane waves, $$e^{-j2k\sqrt{(x-x')^2+(y-y')^2+(z-Z_1)^2}} = \int\int e^{-jk_{x'}(x-x')^2-jk_{y'}(y-y')^2-jk_z(z-Z_1)^2} \, dx'\, dy', \qquad (8)$$

where $k_x$ and $k_y$ range from $-2k$ to $2k$ for propagating waves. Using this decomposition into plane waves and rearranging yields:

$$s(x',y',\omega)) = \iint [\iiint f(x,y,z)e^{-j(k_x x + k_y y + k_z z)}dxdydz] \cdot e^{jk_z Z_1} e^{jk_x x} e^{jk_y y} dk_x dk_y \quad (9)$$

where the triple integral between the brackets [ ] represents a three-dimensional Fourier transform of the reflectivity function, which can be denoted as $F(k_{x'}, k_{y'}, k_z)$. Using this Fourier transform relation, $$s(x', y', \omega) = \iint F(k_{x'}, k_{y'}, k_z)e^{jk_z Z_1} e^{j(k_{x'} x' + k_{y'} y')} dk_{x'} dk_{y'} \quad (10)$$
$$= FT_{2D}^{-1}\{F(k_{x'}, k_{y'}, k_z)e^{jk_z Z_1}\}$$

where FT is used to indicate the Fourier transformation.

Taking the two-dimensional Fourier transform of both sides and dropping the distinction between the primed and unprimed coordinate systems yields:

$$FT_{2D}\{s(x',y',\omega)\} \equiv S(k_x,k_y,\omega) = F(k_x,k_y,k_z)e^{jk_z Z_1} \quad (11)$$

To utilize this relationship in the rendering of the target image, the frequency $\omega$ is desirably expressed as a function of $k_z$. This can be done by using the dispersion relation for plane waves in free-space or a uniform dielectric, $$k_x^2 + k_y^2 + k_z^2 = (2k)^2 = 4\left(\frac{\omega}{c}\right)^2 \quad (12)$$

Using this relation and inverting Equation (11) yields, $$f(x,y,z) = FT_{3D}^{-1}\{F(k_x,k_y,k_z)\} \quad (13)$$

where $$F(k_x,k_y,k_z) = S(k_x,k_y,\omega)e^{jk_z Z_1} \quad (14)$$

Equation (14) suffices for the reconstruction of the image if the data is defined continuously in x, y, and $\omega$, however, for imaging performed using embodiments of the disclosed systems, the data is discretely sampled at substantially uniform intervals of position and frequency. Therefore, the data $s(x, y, \omega)$ is assumed to be uniformly sampled in each variable. Since the data is uniformly sampled in x and y, the two-dimensional Fast Fourier Transform may be used to obtain a sampled version of $S(k_x, k_y, \omega)$. Since the angular frequency $\omega$ is a function of $k_x, k_y, k_z$, this data will contain samples of $F(k_x, k_y, k_z)$. However, these samples are non-uniformly spaced in $k_z$. The samples will be uniformly spaced in $k_x$ and $k_y$, and will lie on concentric spheres of radius $2k$. In order to perform the inverse three-dimensional FFT in Equation (13), the data is desirably resampled to uniformly spaced positions in $k_z$. This can be accomplished, for example, using linear interpolation techniques.

Figure 16:
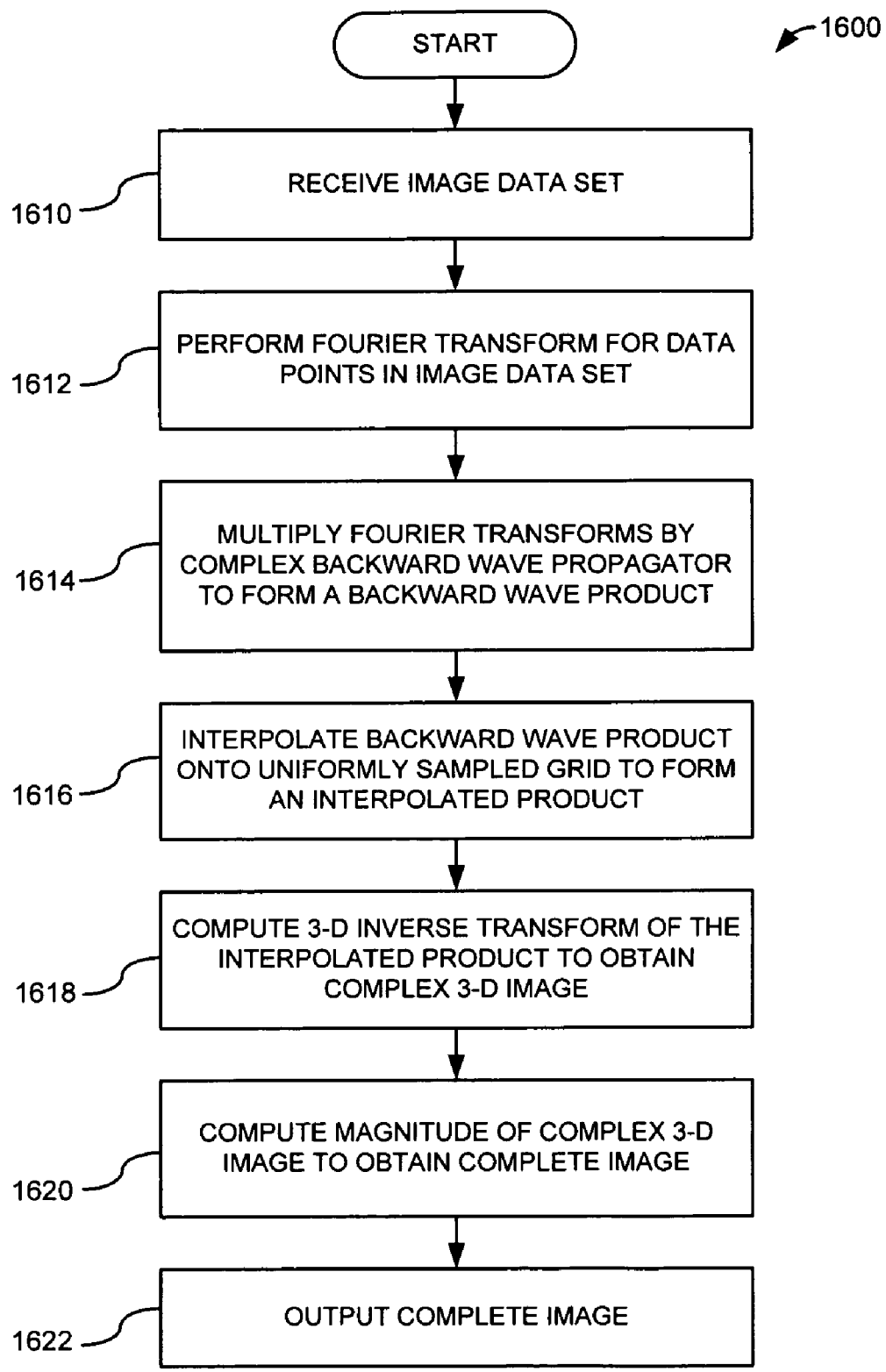
FIG. 16 is a flowchart of an exemplary method of performing the rendering process in FIG. 13.
Figure 17:
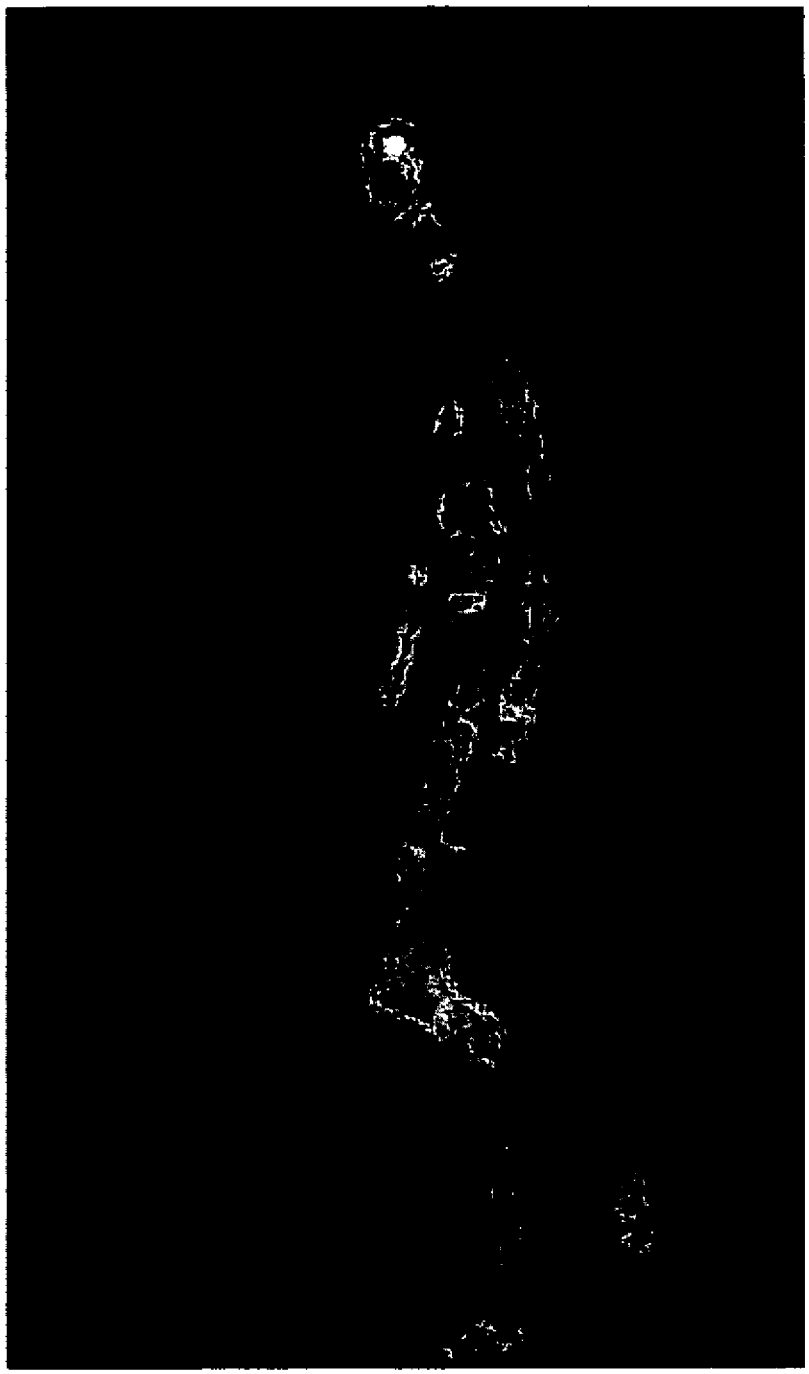
FIG. 17 is an example of a direct image of a subject's body as can be obtained using embodiments of the disclosed technology.

FIG. 16 is a flowchart showing one exemplary procedure 1600 for rendering an image from an image data set as produced, for example, using the scanning procedure of FIG. 13. The exemplary procedure 1600 can be performed, for instance, in the processing system and can be implemented as one or more computer-readable media storing computer-executable instructions for causing a computer to perform the disclosed procedure.

At process block 1610, the image data set is received. For example, sampled data $s(x, y, \omega)$ from multiple antenna element configurations across the rectilinear planar aperture of the antenna array can be received. If the sampled data is available with only one or the other of the real component (I) or the imaginary component (Q), the remaining component can be derived from the sampled data using, for instance, the Hibert Transform. Further, the image data set can be received from the analog/digital converter of the system or retrieved from memory of the processing system where it was stored.

At process block 1612, a two-dimensional Fourier transform of the received data is performed for each data point at each frequency. For example, a two-dimensional Fast Fourier Transform can be performed with respect to x and y to obtain $S(k_x, k_y, \omega)$.

At process block 1614, the two-dimensional Fourier transform is multiplied by a complex backward wave propagator to form a backward wave product. For example, a backward wave propagator (or phase factor) can be multiplied with the Fourier transform in order to spatially shift the data so that it starts at the correct depth. For instance:

$$S(k_x, k_y, \omega)e^{-jk_z Z_1}\Big|_{k_z = \sqrt{4(\omega/c)^2 - k_x^2 - k_y^2}} \quad (15)$$

At process block 1616, the backward wave product is interpolated onto a uniformly sampled grid to form an interpolated product. For example, the backward wave product can be interpolated onto a uniformly sampled $(k_x, k_y, k_z)$ grid from the uniformly sampled $(k_x, k_y, \omega)$ data. For instance:

$$F(k_x, k_y, k_z) = S(k_x, k_y, \omega)e^{-jk_z Z_1}\Big|_{\omega = \frac{c}{2}\sqrt{k_x^2 + k_y^2 + k_z^2}} \quad (16)$$

At process block 1618, the three-dimensional inverse transform of the interpolated product is computed and a complex three-dimensional image obtained. For example, a three-dimensional inverse Fast Fourier Transform can be performed:

$$f(x,y,z) = FT_{3D}^{-1}[F(k_x,k_y,k_z)] \quad (17)$$

At process block 1620, the magnitude of the complex three-dimensional image is computed to obtain a complete three-dimensional image.

At process block 1622, the three-dimensional image is output from the procedure. In embodiments using multiple planar arrays located at different positions, the images can be aligned into a single coordinate system and, in some cases, may be output as a single image or as multiple related images. The three-dimensional image can, among other possibilities, be displayed (for example, as part of a sequence of images showing movement of the target through the aperture of the antenna array), stored for later processing, or analyzed as part of a dynamic analysis procedure (discussed more fully below).

Exemplary Biometric Analysis and Identification Procedures

In this section, exemplary biometric analysis and identification procedures as may be used at process block 1316 of FIG. 13 are described. It should be understood that embodiments of the disclosed technology may not use the described analysis and identification procedures, or may only use a portion of the techniques.

In general, the described techniques are based on the observation that once an individual reaches maturity, his or her skeletal anatomy does not normally change dramatically over time (except in rare circumstances, such as from an accident or disease). Although electromagnetic signals transmitted from embodiments of the disclosed imaging systems do not typically penetrate into an individual's body, spatial coordinate data from the body surface can enable skeletal dimensions or other anthropometrics-relevant measurements to be determined. For example, the length and shape of various bones in a person's body can be extrapolated from surface markers visible in the three-dimensional images produced by embodiments of the disclosed imaging systems (for example, joints, skin protrusion, and the like).

As noted above with respect to FIG. 13, the images produced from the rendering procedure (such as the exemplary rendering procedure 1600) can be analyzed to identify the subject being imaged. For purposes of this discussion, it is assumed that the subject being imaged is a human subject, though it should be understood that the subject could vary depending on the implementation (for example, animals or other suitable objects that are desirably imaged and identified). The analysis procedures can involve a single rendered image where the identification can be made using features extracted from that image (such as at process block 1317), or can involve multiple rendered images where the identification can be made using extracted features that are both static and dynamic (such as at process block 1318).

Figure 19:
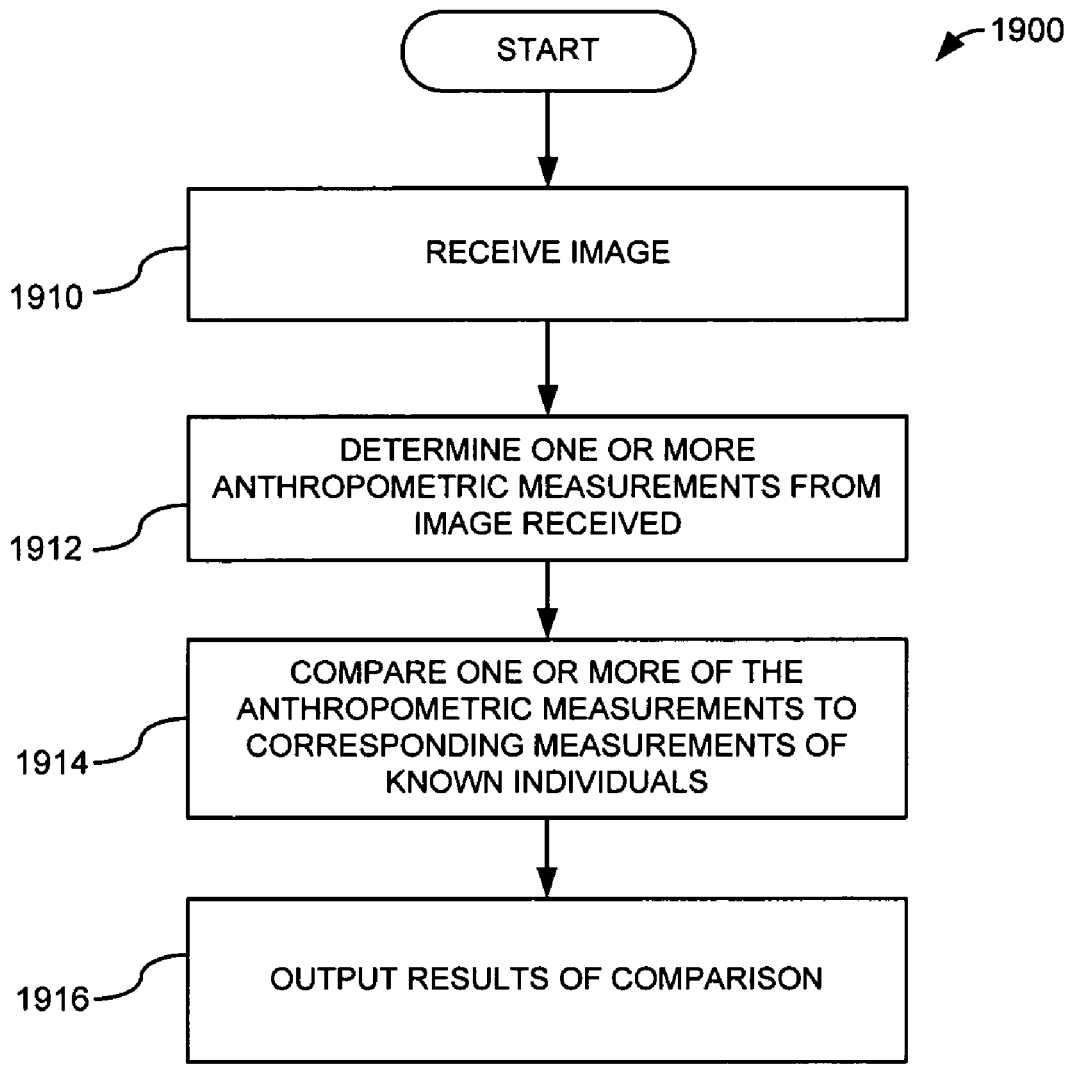
FIG. 19 is a flowchart of an exemplary method of identifying a subject in a rendered image using anthropometric measurements.

FIG. 19 is a flowchart of an exemplary procedure 1900 for analyzing a single image to identify the imaged subject. The exemplary procedure 1900 can be performed, for example, alone, as part of, or in addition to a dynamic analysis procedure. The exemplary procedure 1900 can be performed, for instance, in the processing system and can be implemented as one or more computer-readable media storing computer-executable instructions for causing a computer to perform the disclosed procedure.

At process block 1910, the image of the subject is received (for example, the rendered image from process block 1314 of FIG. 13).

At process block 1912, one or more anthropometric measurements from the image are determined. The anthropometric measurements determined will vary from implementation to implementation and on the desires of the operator. Among the possible anthropometric measurements that can be obtained during this process are the height of the human subject, the lengths of various limbs of the subject, the ratio of one or more of the limb lengths relative to other limb lengths, and other such geometric measurements of the subject's body. Other possible anthropometric measurements are described in ISO 7250 from the International Organization for Standardization.

A variety of techniques can be used to determine the anthropometric measurements from the rendered image. In certain embodiments of the disclosed technology, body measurement software from Human Solutions, GMBH, or [TC]$^2$ is adapted to receive the image and extract the desired measurements. For instance, in particular embodiments, ScanWorX AutoMeasure software available from Human Solutions, GMBH, is used to determine the desired anthropometric measurements. In other embodiments, measurement extraction software available from [TC]$^2$ is used to determine the desired anthropometric measurements.

Other model-based or non-model-based techniques can also be used. Model-based techniques can be characterized as techniques that use a known human model that is fit to the image. Because model-based approaches fit an existing model to the image, they can usually handle occlusion in the image. By contrast, in model-free approaches, no a priori model is used. In a typical non-model approach, a model of the subject in the image is "built" using only data from the image itself.

In specific embodiments using a model-based approach, the subject in the image is mapped to a human representation from which the desired anthropometric measurements can more easily be obtained. For instance, the model can be a stick representation of the human body that is fitted to a silhouette of the subject in the image. Other possible models include those based on cylinders, boxes, ellipsoids, rectangles, cones and spheres, and other such geometric shapes. Furthermore, the number of joints and degrees of freedom that are represented in the model can similarly vary from implementation to implementation.

In non-model approaches, a particular representation of the subject is not known beforehand. In many non-model approaches, however, a model is built from the image. For example, in one particular embodiment, medial axis transformation techniques or distance transformation techniques are used to create a stick-figure from the image. The model built can alternatively be based on a wide variety of shapes, including for example ellipses, boxes, cylinders, ellipsoids, so-called "blobs," and other such geometric shapes. In still other embodiments, three-dimensional or volumetric models can be used. For example, a point cloud of the body surface can be obtained from the image, and surface definitions, such as mesh and rendered surfaces, can be constructed. For instance, any of the techniques described in U.S. Patent Application Publication No. 2006/0066469 can be used to produce a volumetric or topographical representation of the subject. In other embodiments, wire frame models or solid body models are created form the images.

From the models used or created during this process, one or more anthropometric measurements can be extracted. In general, once the model is created or fitted, extracting desired anthropometric measurements can be performed relatively simply using the coordinates of the model and possibly information about the distance to the target, which can be determined from the signals received in the transceiver/array system. In certain embodiments, multiple images are analyzed before the anthropometric measurements are extracted in order to more accurately measure the subject and help avoid problems resulting from occlusion (for example, one or more of the legs or arms of the subject being blocked by the subject's body as the subject walks).

The techniques discussed above should not be construed as limiting, as there exist several suitable techniques that can be used to determine anthropometric measurements from the image as in process block 1912. For example, any of the human body modeling techniques discussed and cited in Wang, J. J. and Singh, S., "Video Analysis of Human Dynamics: A Survey," (available at http://citeseer.ist.psu.edu/715203.html); Moeslund, T. and Granum, E., "A Survey of Computer Vision-Based Human Motion Capture," *Computer Vision and Image Understanding*, Volume 81, Issue 3, pp. 231-268 (March 2001) (also available at http://citeseer.ist.psu.edu/moeslund01survey.html); Bray J., "Markerless Based Human. Motion Capture: A Survey," (available at http://www.visicast.co.uk/members/move/Partners/Papers/MarkerlessSurvey.pdf); or Dawson, M. R., "Gait Recognition: Final Report," (available at http://www.doc.ic.ac.uk/teaching/projects/Distinguished02/MarkDawson.pdf), which are all hereby incorporated herein by reference, can be used (at least in part) in embodiments of the disclosed technology. It should therefore be understood that the disclosed technology is not limited to any one particular modeling and/or extraction technique but encompasses all suitable known and hereinafter discovered techniques as would occur to those skilled in the art.

At process block 1914, one or more of the anthropometric measurements determined can be compared to corresponding measurements of known individuals. The corresponding measurements can be stored, for example, in an authentication dataset. In an exemplary embodiment, the comparison can be performed in order to determine the identity of the subject in the image received at process block 1910. The imaged subject can be identified as a known individual in the authentication dataset based on one or more criteria for matching selected anthropometric measurements (for example, whether the measurements are within a certain percentage deviation of one another (which may be user defined)). In general, a dataset entry for a selected individual can contain any number of anthropometric measurements. For example, a dataset entry could contain dozens, hundreds (and in some cases, thousands) of relevant anthropometric measurements. The anthropometric measurements in the dataset are typically obtained by measuring individuals beforehand under controlled circumstances (for example, the individuals may be asked to walk through an embodiment of the imaging system one or more times in order to obtain an accurate dataset entry, or another imaging system more specifically designed for obtaining precise measurements can be used).

According to one exemplary embodiment of the disclosed technology, a statistically enabling subset of the available anthropometric measurements is randomly selected and compared to the corresponding measurements in the dataset. Thus, in this exemplary embodiment, it is difficult for an individual to deceive the system because the body measurements used to authenticate identity are not known in advance. In certain embodiments of the disclosed technology, this "static" biometric analysis is combined with another non-invasive authentication procedure (for example, three-dimensional face recognition, dynamic biometrics, and the like), thereby enhancing the performance effectiveness of the system.

At process block 1916, the results of the comparison are output. For example, the identity of the subject in the image can be output to the user of the imaging system. For instance, this output may be via a display coupled to the imaging processing system and can be accompanied with other relevant data, such as whether the individual has the appropriate clearance to an area.

Because certain embodiments of the imaging system described herein are able to collect and produce multiple images at a sufficiently high rate (for example, more than 3 images per second, such as 30 to 50 images per second), dynamic biometric information can also be obtained from subjects moving through the aperture of the antenna array (for example, people walking down a corridor having one or more walls with an antenna array mounted therein as in FIG. 1). Geometric body measurements can be determined as described above, but can further be analyzed over time in order to determine dynamic biometric information, such as an individual's body movements (for example, overall gait, side-to-side motion, posture when walking, gestures, or other characteristic movements). This dynamic information can also be used to identify the subject.

Figure 20:
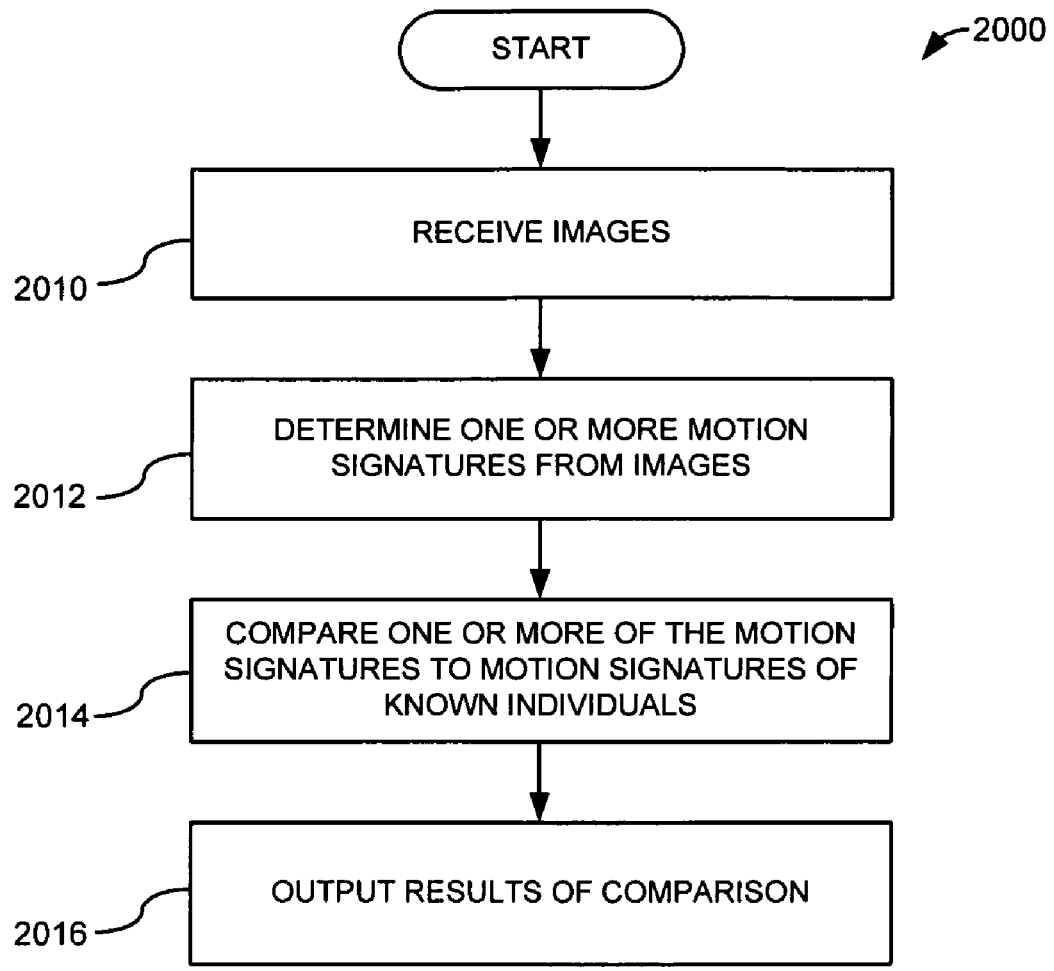
FIG. 20 is a flowchart of an exemplary method of identifying a subject in multiple rendered images using motion signatures.

FIG. 20 is a flowchart of an exemplary procedure 2000 for analyzing multiple images to identify the imaged subject. The exemplary procedure 2000 can be performed, for example, alone, as part of, or in addition to the "static" image analysis process described above at process block 1900. The exemplary procedure 2000 can be performed, for instance, in the processing system of the imaging system and can be implemented as one or more computer-readable media storing computer-executable instructions for causing a computer to implement the disclosed procedure.

At process block 2010, two or more images of the subject are received (for example, two or more rendered images from process block 1314 of FIG. 13). The number of images used will vary depending on the implementation, but is desirably large enough to obtain motion signatures accurately.

At process block 2012, one or more motion signatures are determined from the received images. For example, in certain embodiments of the disclosed technology, one or more motion signatures are extracted from models of the imaged subject that are created or fit for each respective image in the set (for example, using any of the non-model-based or model-based techniques described above).

In general, a motion signature comprises one or more metrics or values that represent the motion of one or more limbs of the subject over time. The motion signatures can comprise, for example, information about the velocity, acceleration, angular disposition, angular velocity, and/or relative positions of the subject's head or trunk or of one or more limbs of the subject as the subject moves. The motion signatures used are typically ones that are indicative of the identity of the subject. Among the possible types of motion signatures that can be used are signatures associated with the gait of the subject—that is, the way or manner the subject moves on foot. Specifically, the motion signatures might be based on the posture of the subject, the movement of the subject's hands or limbs as the subject is moving on foot, the motion of the subject's trunk, the orientation of the subject's head, or any other characteristic movement or combination thereof. The motion signatures determined at process block 2012 will vary from implementation to implementation and on the desires of the operator.

Motion signatures associated with the gait of the subject are sometimes referred to as "gait signatures." It is convenient to obtain such signatures as a subject moves on foot (for example, when the subject is walking, jogging, running, skipping, or otherwise moving by foot from one location to another). Gait is a useful dynamic biometric as it can be detected using fairly low resolution images and because it is difficult to disguise. A subject's gait, however, can often be obscured by clothing worn by the subject. Thus, by using embodiments of the disclosed imaging system, direct images of a subject's body can be obtained regardless of the clothing worn by the individual.

A wide variety of techniques can be used to extract one or more motion signatures associated with the subject's gait or other motion signatures. For example, a variety of non-model-based techniques can be used. Such techniques typically process the motion signature for gait using the silhouette of the subject obtained from the image. For example, known techniques based on analyzing a subjects' trajectory, principal components analysis (PCA), moments of flow, dense optical flow, a combination of PCA with canonical analysis, hidden Markov models, eigenanalysis, matching silhouettes using a baseline approach, data derivation of stride patterns, key frame analysis for sequence matching, ellipsoidal fits, point distribution models, eigenspace transformations of an unwrapped human silhouette, measuring area using a baseline-type approach, object description including symmetry, statistical moments, spatio-temporal patterns, or a combination of canonical space transformation based on canonical analysis or linear discriminant analysis together with eigenspace transformations, can be used.

Model-based approaches can also be used. For example, known techniques based on the use of frequency components of a thigh's motion, unified models without parameter selection, cyclic descriptions (for example, cyclograms) of leg motion, hidden Markov models that recognize gait from models, active contour models, or motion models based on analytically derived motion curves for body parts can be used.

The techniques discussed above should not be construed as limiting, as there exist several suitable techniques that can be used to extract one or more motion signatures from the images in process block 2012. For example, any of the gait signature extraction and detection techniques discussed and cited in Wang, J. J. and Singh, S., "Video Analysis of Human Dynamics: A Survey," (available at http://citeseer.ist.psu.edu/715203.html); Moeslund, T. and Granum, E., "A Survey of Computer Vision-Based Human Motion Capture," *Computer Vision and Image Understanding*, Volume 81, Issue 3, pp. 231-268 (March 2001) (also available at http://citeseer.ist.psu.edu/moeslund01survey.html); Bray J., "Markerless Based Human Motion Capture: A Survey," (available at http://www.visicast.co.uk/members/move/Partners/Papers/MarkerlessSurvey.pdf); Dawson, M. R., "Gait Recognition: Final Report," (available at http://www.doc.ic.ac.uk/teaching/projects/Distinguished02/MarkDawson.pdf); Nixon, M. S. et al, "Automatic recognition by gait: progress and prospects," *Sensor Review*, vol. 23, number 4, pp. 323-331 (2003); Cunado, D., et al., "Automatic extraction and description of human gait models for recognition purposes," *Computer Vision and Image Understanding*, pp. 1-41 (2003); or U.S. Patent Application Publication No. 2005/0210036, which are all incorporated herein by reference, can be used (at least in part) in embodiments of the disclosed technology. It should therefore be understood that the disclosed technology is not limited to any one particular modeling and/or extraction technique but encompasses all suitable known and hereinafter discovered techniques as would occur to those skilled in the art.

At process block 2014, one or more of the motion signatures determined can be compared to corresponding motion signatures of known individuals. The corresponding motion signatures can be stored, for example, in an authentication dataset. In general, an entry for a selected individual in the authentication dataset can contain any number motion signatures and/or anthropometric measurements. In an exemplary embodiment, the comparison can be performed in order to determine the identity of the imaged subject. For example, the imaged subject can be identified as a known individual in the authentication dataset based on one or more criteria for matching the relevant motion signatures (possibly in combination with one or more anthropometric measurements). A match can be determined, for example, if the motion signatures are within a certain percentage deviation of one another (which may be user defined). According to one exemplary embodiment of the disclosed technology, a statistically enabling subset of the available motion signatures is randomly selected and compared to the corresponding measurements in the dataset.

At process block 2016, the results of the comparison are output. For example, the identity of the subject in the image can be output to the user of the imaging system. For instance, this output may be via a display unit coupled to the imaging processing system and can be accompanied with other relevant data, such as whether the individual has the appropriate access to an area.

It should be understood, however, that certain embodiments of the disclosed imaging systems do not use these identification techniques, as the desired result of such systems is the rendered images obtained as described above. For example, in implementations of the imaging system used to view and analyze the behavior of a subject's body in one or more items of apparel (such as the motion of the foot within a shoe during walking or running), the identification procedures described above may not be used. Similarly, in implementations of the imaging system that are used for motion capture or animation purposes, the described identification procedures may not be used. Such implementations, however, may use some or all of the anthropometric extraction and/or motion signature extraction procedures discussed above.

In view of the many possible embodiments to which the principles of the disclosed technology may be applied, it should be recognized that the illustrated embodiments are only preferred examples of the disclosed technology and should not be taken as limiting the scope of the disclosed technology. Rather, the scope of the disclosed technology is defined by the following claims and their equivalents. We therefore claim all that comes within the scope and spirit of these claims.

We claim:

1. A method, comprising:
    generating two or more direct images of the body of a clothed subject by irradiating the subject with electromagnetic radiation selected to substantially penetrate clothing and to substantially reflect from the body of the subject, wherein each of the two or more direct images comprises spatial coordinate data associated with the surface of the body of the subject, and wherein the two or more images indicate movement of the body of the subject over time; and
    using a computer, determining a motion signature from the two or more images, the motion signature being associated with the movement of the body of the subject.

2. The method of claim 1, further comprising identifying the subject based at least in part on the motion signature.

3. The method of claim 2, further comprising,
    determining an anthropometric measurement from the two or more images; and
    identifying the subject based at least in part on the anthropometric measurement in addition to the motion signature.

4. The method of claim 2, wherein the identifying comprises comparing the motion signature with a corresponding authenticated motion signature.

5. The method of claim 4, wherein the motion signature is a first motion signature, and wherein the method further comprises:
    determining multiple additional motion signatures from the two or more images; and
    randomly selecting the motion signature for comparison with the corresponding authenticated motion signature from among the first motion signature and the multiple additional motion signatures.

6. The method of claim 1, wherein the motion signature is a gait signature.

7. The method of claim 1, wherein the two or more direct images are captured at a rate of at least about two images per second.

8. The method of claim 1, wherein the generating comprises irradiating the subject with electromagnetic radiation in a range of about 200 MHz to about 1 THz.

9. The method of claim 1, wherein the generating comprises irradiating the subject with electromagnetic radiation from an antenna array concealed from the subject.

10. The method of claim 1, further comprising determining whether the subject is authorized to be in a secured area based at least in part on the motion signature.

11. The method of claim 1, wherein the two or more direct images also indicate that at least one concealed object is being carried by the subject, the method further comprising detecting the at least one concealed object.

12. One or more computer-readable memory components storing computer-executable instructions for causing a computer to perform a method, the method comprising:
- receiving two or more direct images of the body of a clothed subject, wherein the two or more images are generated by irradiating the subject with electromagnetic radiation selected to substantially penetrate clothing and to substantially reflect from the body of the subject, wherein each of the two or more direct images comprises spatial coordinate data associated with the surface of the body of the subject, and wherein the two or more images indicate movement of the body of the subject over time; and
- determining a motion signature from the two or more images, the motion signature being associated with the movement of the body of the subject.

13. An imaging system, comprising a processing system that executes the computer-executable instructions of claim 12.

14. The one or more computer-readable memory components of claim 12, wherein the method further comprises identifying the subject based at least in part on the motion signature.

15. The one or more computer-readable memory components of claim 14, wherein the method further comprises:
- determining an anthropometric measurement from the two or more images; and
- identifying the subject based at least in part on the anthropometric measurement in addition to the motion signature.

16. The one or more computer-readable memory components of claim 14, wherein the identifying comprises comparing the motion signature with a corresponding authenticated motion signature.

17. The one or more computer-readable memory components of claim 16, wherein the motion signature is a first motion signature, and wherein the method further comprises:
- determining multiple additional motion signatures from the two or more images; and
- randomly selecting the motion signature for comparison with the corresponding authenticated motion signature from among the first motion signature and the multiple additional motion signatures.

18. The one or more computer-readable memory components of claim 12, wherein the motion signature is a gait signature.

19. The one or more computer-readable memory components of claim 12, wherein the two or more images are generated at a rate of at least about two images per second.

20. The one or more computer-readable memory components of claim 12, wherein the two or more direct images are generated by irradiating the subject with electromagnetic radiation in a range of about 200 MHz to about 1 THz.

21. The one or more computer-readable memory components of claim 12, wherein the two or more direct images are generated by irradiating the subject with electromagnetic radiation from an antenna array concealed from the subject.

22. The one or more computer-readable memory components of claim 12, wherein the method further comprises determining whether the subject is authorized to be in a secured area based at least in part on the motion signature.

23. The one or more computer-readable memory components of claim 12, wherein the two or more direct images also indicate that at least one concealed object is being carried by the subject, the method further comprising detecting the at least one concealed object.

24. The one or more computer-readable memory components of claim 12, wherein the two or more direct images are generated by irradiating the subject with electromagnetic radiation from an antenna array comprising a plurality of antenna elements, the plurality of antenna elements being arranged into rows and columns.

25. The one or more computer-readable memory components of claim 24, wherein the irradiating the subject comprises transmitting the electromagnetic radiation to the subject from a first antenna element of the antenna array, and detecting returned electromagnetic radiation that is associated with the first antenna element by a second antenna element and a third antenna element of the antenna array.

26. The method of claim 1, wherein the two or more direct images are generated by irradiating the subject with electromagnetic radiation from an antenna array comprising a plurality of antenna elements, the plurality of antenna elements being arranged into rows and columns.

27. The method of claim 12, wherein the irradiating the subject comprises transmitting the electromagnetic radiation to the subject from a first antenna element of the antenna array, and detecting returned electromagnetic radiation that is associated with the first antenna element by a second antenna element and a third antenna element of the antenna array.

* * * * *